US010223436B2

(12) United States Patent
Bourd et al.

(10) Patent No.: US 10,223,436 B2
(45) Date of Patent: Mar. 5, 2019

(54) INTER-SUBGROUP DATA SHARING

(71) Applicant: QUALCOMM Incorporated, San Diego, CA (US)

(72) Inventors: Alexei Vladimirovich Bourd, San Diego, CA (US); Vladislav Shimanskiy, San Diego, CA (US); Maxim Kazakov, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 15/258,207

(22) Filed: Sep. 7, 2016

(65) Prior Publication Data

US 2017/0316076 A1   Nov. 2, 2017

Related U.S. Application Data

(60) Provisional application No. 62/328,228, filed on Apr. 27, 2016.

(51) Int. Cl.
| | | |
|---|---|---|
| *G06F 17/00* | (2006.01) | |
| *G06F 17/30* | (2006.01) | |
| *G06F 3/06* | (2006.01) | |
| *G06F 9/52* | (2006.01) | |
| *G06F 9/54* | (2006.01) | |

(52) U.S. Cl.
CPC ...... *G06F 17/30581* (2013.01); *G06F 3/0613* (2013.01); *G06F 3/0647* (2013.01); *G06F 3/0683* (2013.01); *G06F 9/522* (2013.01); *G06F 9/54* (2013.01)

(58) Field of Classification Search
CPC .. G06F 19/00; G06F 12/0811; G06F 12/0831; G06F 12/0862; G06F 12/0864; G06F 12/1027

See application file for complete search history.

(56) References Cited

U.S. PATENT DOCUMENTS

| | | | |
|---|---|---|---|
| 8,677,106 B2 | 3/2014 | Nickolls et al. | |
| 9,329,877 B2 | 5/2016 | Donaldson et al. | |
| 2009/0100196 A1 | 4/2009 | Jia | |
| 2013/0024667 A1 | 1/2013 | Kyo | |
| 2013/0332937 A1 | 12/2013 | Gaster et al. | |
| 2014/0289250 A1* | 9/2014 | Nojima | G05B 19/4183 707/737 |
| 2015/0227466 A1 | 8/2015 | Kyo | |

OTHER PUBLICATIONS

International Search Report and Written Opinion—PCT/US2017/019648—ISA/EPO—dated Jun. 1, 2017, 13 pages.
Ashbaugh et al., "cl_intel_subgroups", OpenCL Extension 35, Version 4, URL: https://www.khronos.org/registry/OpenCL/extensions/intel/cl_intel_subgroups.txt; Aug. 28, 2016, 7 pp.

* cited by examiner

*Primary Examiner* — Truong V Vo
(74) *Attorney, Agent, or Firm* — Shumaker & Sieffert, P.A.

(57) ABSTRACT

In an example, a method of transferring data may include synchronizing work-items corresponding to a first subgroup and work-items corresponding to a second subgroup with a barrier. The method may include performing an inter-subgroup data transfer between the first subgroup and the second subgroup.

30 Claims, 8 Drawing Sheets

```
named_barrier K(3);
K.wait();
Foo = subgroup_exchange(Bar, (subgroupId++)%3);
K.wait();
```

INTER-SUBGROUP DATA SHARING

This application claims the benefit of U.S. Provisional patent Application No. 62/328,228 filed on Apr. 27, 2016, which is hereby incorporated by reference herein in its entirety.

TECHNICAL FIELD

This disclosure relates to inter-subgroup data sharing on a processing unit.

BACKGROUND

Processing units, such as a CPU or a GPU, may execute a plurality of work-items. Each work-item may belong to, or otherwise correspond to, a work-group. Each work-group may include one or more work-items, and each work-group may include one or more subgroups. Each work-item may belong to one work-group and one subgroup. Processing units may allow for the sharing of data between work-items of the same subgroup.

SUMMARY

In general, this disclosure describes one or more techniques for enabling inter-subgroup data transfer. In some examples, the inter-subgroup data transfer described herein may be described with respect to the subgroups, with respect to the one or more work-items corresponding to each subgroup, and/or with respect to the memory location(s) or memory space corresponding to each work-item. For example, this disclosure describes one or more techniques for enabling inter-group data transfer between two or more subgroups. As another example, this disclosure describes one or more techniques for enabling inter-group data transfer between two or more subgroups of a work-group. As another example, this disclosure describes one or more techniques for enabling inter-group data transfer between work-items of different subgroups.

In one example, this disclosure describes a method comprising executing, by a processing unit, a first work-item, wherein the first work-item corresponds to a first subgroup; executing, by the processing unit, a second work-item, wherein the second work-item corresponds to a second subgroup; executing, by the processing unit, a first barrier that synchronizes each work-item of the first subgroup and each work-item of the second subgroup; performing, by the processing unit once each work-item of the first subgroup and each work-item of the second subgroup are synchronized by the first barrier, an inter-subgroup data transfer between the first subgroup and the second subgroup; and executing, by the processing unit, a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

In another example, this disclosure describes a device comprising a processing unit including: one or more compute units, wherein each of the one or more compute units includes one or more processing elements for executing one or more work-items; a local memory accessible by each of the one or more compute units; and a private memory accessible by each of the one or more processing elements, wherein the processing unit is configured to: execute a first work-item, wherein the first work-item corresponds to a first subgroup; execute a second work-item, wherein the second work-item corresponds to a second subgroup; execute a first barrier that synchronizes each work-item of the first subgroup and each work-item of the second subgroup; performing, once each work-item of the first subgroup and each work-item of the second subgroup are synchronized by the first barrier, an inter-subgroup data transfer between the first subgroup and the second subgroup; and execute a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

In another example, this disclosure describes an apparatus comprising means for executing a first work-item, wherein the first work-item corresponds to a first subgroup; means for executing a second work-item, wherein the second work-item corresponds to a second subgroup; means for executing a first barrier that synchronizes each work-item of the first subgroup and each work-item of the second subgroup; means for performing, once each work-item of the first subgroup and each work-item of the second subgroup are synchronized by the first barrier, an inter-subgroup data transfer between the first subgroup and the second subgroup; and means for executing a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

In another example, this disclosure describes a non-transitory computer-readable storage medium having instructions stored thereon that, when executed, cause one or more processors to: execute a first work-item, wherein the first work-item corresponds to a first subgroup; execute a second work-item, wherein the second work-item corresponds to a second subgroup; execute a first barrier that synchronizes each work-item of the first subgroup and each work-item of the second subgroup; perform, once each work-item of the first subgroup and each work-item of the second subgroup are synchronized by the first barrier, an inter-subgroup data transfer between the first subgroup and the second subgroup; and execute a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes one or more techniques for enabling inter-subgroup data transfer. In some examples, the inter-subgroup data transfer described herein may be described with respect to the subgroups, with respect to the one or more work-items corresponding to each subgroup, and/or with respect to the memory location(s) or memory space corresponding to each work-item. For example, this disclosure describes one or more techniques for enabling inter-group data transfer between two or more subgroups. As another example, this disclosure describes one or more techniques for enabling inter-group data transfer between two or more subgroups of a work-group. As another example, this disclosure describes one or more techniques for enabling inter-group data transfer between work-items of different subgroups.

Figure 1:
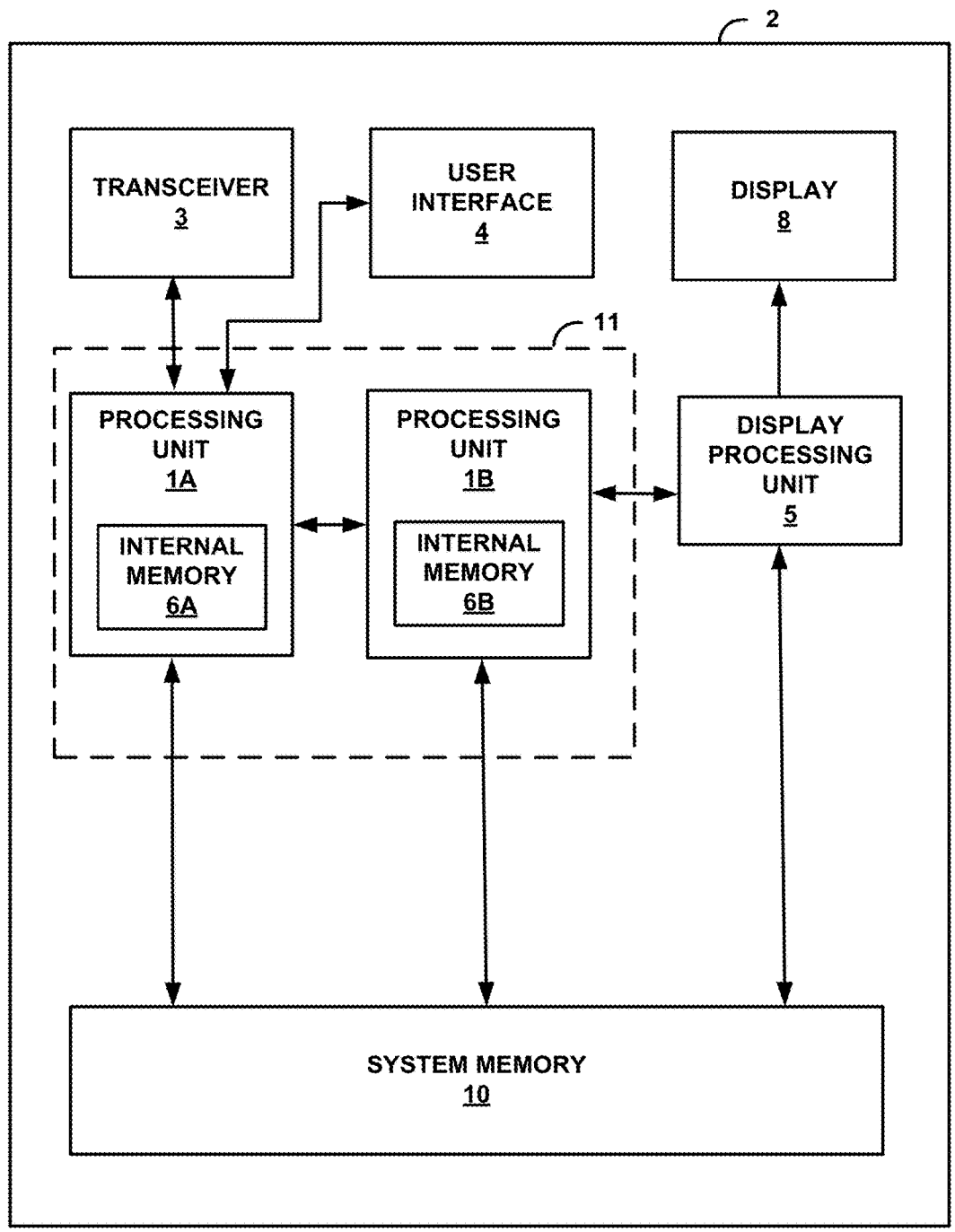
FIG. 1 is a block diagram illustrating a computing device that may be configured to implement the techniques of this disclosure.

FIG. 1 is a block diagram illustrating an example computing device (e.g., computing device 2) and/or a processing unit (e.g., processing unit 1A or processing unit 1B) that may be configured to implement one or more aspects of this disclosure. As shown in FIG. 1, computing device 2 may be, for example, a personal computer, a desktop computer, a laptop computer, a tablet computer, a computer workstation, a video game platform or console, a mobile telephone (e.g., a cellular or satellite telephone), a handheld device (e.g., a portable video game device or a personal digital assistant (PDA)), a wearable computing device, a personal music player, a video player, a display device, a television, a network device, an intermediate network device, any computing device, or any other type of device that may be configured to implement one or more aspects of this disclosure.

Computing device 2 may include one or more processing units 1, transceiver 3, user interface 4, display processing unit 5, display 8, and system memory 10. In the example of FIG. 1, computing device is shown as including two processing units: processing unit 1A and processing unit 1B, but other examples may have more or fewer processing units than those shown. As used herein, reference to processing unit 1 may refer to one or more processing units, e.g., processing unit 1A and/or processing unit 1B. For example, reference to processing unit 1 may refer to processing unit 1A. As another example, reference to processing unit 1 may refer to processing unit 1B. As another example, reference to processing unit 1 may refer to processing unit 1A and/or processing unit 1B. As yet another example, reference to processing unit 1 may refer to one or more processing units 1. Processing unit 1 may be configured to perform heterogeneously with other processing units. For example, processing unit 1A and processing unit 1B may be configured to perform heterogeneously with one another. It is therefore understood that computing device 2 may be configured to perform heterogeneous computing. Processing unit 1 may be integrated into any computing device.

The various components, shown in computing device 2 in the example of FIG. 1 may not be necessary in every example of computing device 2. For example, computing device 2 may, in other examples, may not include one or more components shown in the example of FIG. 1 (e.g., display processing unit 5). In other examples, computing device 10 may include one or more components in addition to the components illustrated in the example of FIG. 1.

Processing unit 1 may be a central processing unit (CPU), a graphics processing unit (GPU), a parallel processing unit (e.g., any processing unit configured to perform parallel processing), a system on chip (SoC), or any other processing unit that may be configured to perform one or more techniques described herein. In some examples, processing unit 1 may be a GPU with general purpose processing capabilities, and may be referred to as a general purpose GPU (GPGPU) when implementing general purpose processing tasks (e.g., non-graphics related tasks). Accordingly, as used herein, reference to a GPU may mean a GPU with or without general purpose processing capabilities. In some examples, processing unit 1 may be any processing unit that may be configured to perform inter-subgroup and/or intra-subgroup data sharing. In some examples, processing unit 1 may be a single instruction multiple data (SIMD) processor, a multiple instruction multiple data (MIMD) processor, a single program multiple data (SPMD) processor, or a multiple program multiple data (MPMD) processor. In some examples, processing unit 1A may be a CPU, and processing unit 1B may be a GPU. In other examples, processing unit 1B may be a CPU, and processing unit 1A may be a GPU.

Processing unit 1 may include one or more processors (e.g., one or more microprocessors), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing.

Processing unit 1 may include one or more internal memories 6 and one or more memory controllers. The one or more memory controllers may be configured to control access to one or more memories (e.g., one or more internal memories 6 and/or system memory 10). In some examples, the one or more memory controllers may be configured to serialize memory requests. In the example of FIG. 1, computing device 2 is shown as including two processing units: processing unit 1A and processing unit 1B. As used herein, reference to one or more internal memories 6 may refer to one or more memories 6A and/or one or more internal memories 6B.

Memory external to processing unit 1, such as depicted system memory 10, may be accessible to processing unit 1. For example, processing unit 1 may be communicatively coupled to system memory 10 over a bus (e.g., any communication medium, whether wired or wireless).

One or more internal memories 6 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media, any on-chip memory (e.g., any integrated memory of processing unit 1), or any other internal memory.

System memory 10 may be considered as the memory for computing device 2. System memory 10 may comprise one or more computer-readable storage media. System memory 10 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, SDRAM DDR SDRAM, a magnetic data media or an optical storage media, any off-chip memory (e.g., any memory external to processing unit 1), any other memory, or any other medium that can be used to store one or more instructions and/or data structures and that can be accessed by a processing unit (e.g., processing unit 1). System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from any device with which it is communicatively coupled, and moved to another device. As another example, memory, substantially similar to system memory 10, may be inserted into a computing device, such as computing device 2 depicted in FIG. 1.

In some examples, system memory 10 may include instructions that, when executed, cause processing unit 1 to perform the functions ascribed to processing unit 1 in this disclosure. Accordingly, system memory 10 may be a computer-readable storage medium having instructions stored thereon that, when executed, cause one or more processors (e.g., processing unit 1) to perform one or more functions.

Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may or may not be integrated with processing unit 1. For example, transceiver 3 may be part of the same integrated circuit (IC) as processing unit 1, may be external to the IC or ICs that may include part or all of processing unit 1, or may be formed in an IC that is external to the IC or ICs that may include part or all of processing unit 1. For example, transceiver 3 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

Examples of user interface 4 may include, but are not limited to, a trackball, a mouse, a keyboard, and any other input device. For example, user interface 4 may include a touch screen, which may be incorporated as part of display 8. Display 8 may comprise a liquid crystal display (LCD), a cathode ray tube (CRT) display, a plasma display, a touch-sensitive display, a presence-sensitive display, or any other type of display. In examples where user interface 4 is partially or fully implemented using software (e.g., a graphical user interface), the software may be executed by processing unit 1 or a processing unit different from processing unit 1, and the software may be stored on a memory (e.g., on-chip memory such as one or more internal memories 6 or off-chip memory such as system memory 10). Processing unit 1 may be configured to access and execute the software instructions stored on the memory to implement one or more aspects of user interface 4.

Display processing unit 5 may or may not utilize a tile-based architecture. In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processing unit 5 may be configured to fetch multiple image layers (e.g., foreground and background) from at least one memory. For example, display processing unit 5 may be configured to fetch image layers from a frame buffer to which a processing unit (e.g., processing unit 1, such as processing unit 1B in some examples) outputs graphical data in the form of pixel representations and/or other memory. The multiple image layers may include foreground layers and/or background layers. As used herein, the term "image" is not intended to mean only a still image. Rather, an image or image layer may be associated with a still image (e.g., the image or image layers when blended may be the image) or a video (e.g., the image or image layers when blended may be a single image in a sequence of images that when viewed in sequence create a moving picture or video).

Display processing unit 5 may be configured to process pixels from multiple layers. Example pixel processing that may be performed by display processing unit 5 may include up-sampling, down-sampling, scaling, rotation, and/or other pixel processing. For example, display processing unit 5 may be configured to process pixels associated with foreground image layers and/or background image layers. Display processing unit 5 may be configured to blend pixels from multiple layers, and write back the blended pixels into memory in tile format. Then, the blended pixels may be read from memory in raster format and sent to display 8 for presentment.

Referring now to processing unit 1, processing unit 1 (e.g., processing unit 1A) may be configured to execute various types of applications. Instructions for execution of the one or more applications may be stored within a memory accessible by processing unit 1 (e.g., one or more internal memories 6 and/or system memory 10). Processing unit 1 may be configured to transmit and/or receive one or more processing tasks from another processing unit. For example, processing unit 1A (e.g., a CPU) may be configured to offload one or more processing tasks to processing unit 1B (e.g., a GPU).

Processing unit 1 may be configured to perform one or more processes in accordance with a computing platform (e.g., a framework for parallel programming) that may include a programming language, an application program interface (API), libraries, and/or a runtime system. In other examples, a computing platform may refer to a computing standard and/or computing specification. For example, processing unit 1 may be configured to perform one or more processes in accordance with the OpenCL computing platform using the OpenCL API. Aspects of this disclosure are not limited to the OpenCL computing platform and/or the OpenCL APIs. For example, processing unit 1 may be configured to perform one or more processes in accordance with any parallel computing platform, any heterogeneous computing platform, and the like. For example, processing unit 1 may be configured to perform one or more processes in accordance with the OpenGL computing platform, the CUDA computing platform, the HSA Foundation computing platform, the Vulkan API, and the like. Additionally, the techniques described in this disclosure are not required to function in accordance with an API.

Figure 2:
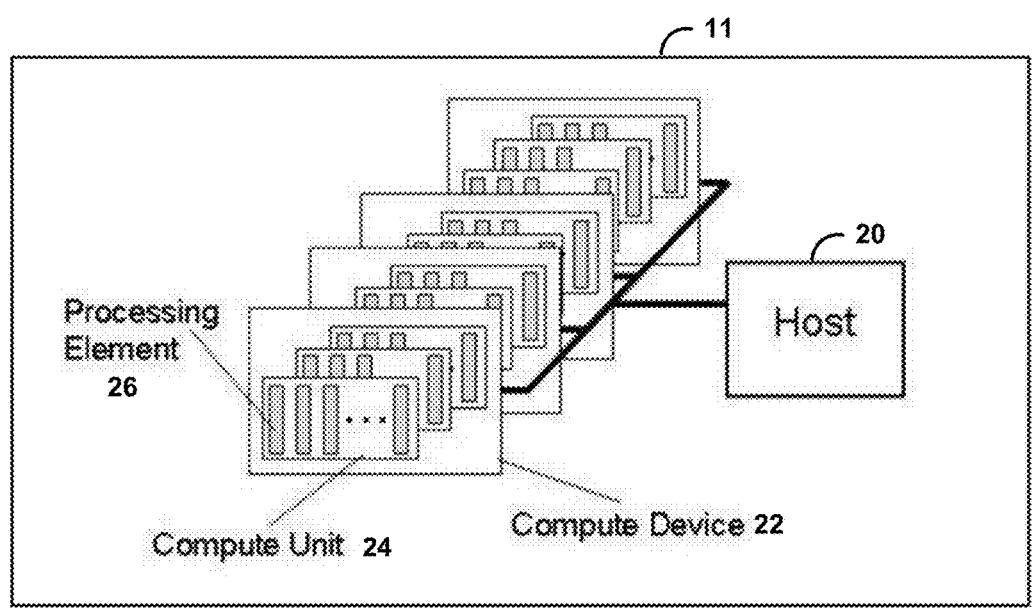
FIG. 2 illustrates the one or more processing units shown in FIG. 1 that may be configured to implement the techniques of this disclosure in greater detail.

As shown and described in FIG. 1, computing device 2 may include one or more processing units 1 shown in an exemplary system (e.g., a heterogeneous system) 11, which may be referred to as an exemplary processing system architecture. FIG. 2 illustrates an example of system 11 in more detail according to a heterogeneous processing architecture. In some examples, the heterogeneous processing system architecture depicted in system 11 of FIG. 2 may be configured in accordance with the OpenCL computing platform. It is therefore understood that while the terms used in relation to any figure described herein may relate to a particular computing platform (e.g., OpenCL, OpenGL, CUDA, etc), it is to be understood that the example is not limited to that particular computing platform. For example, the example of FIG. 2 is described using OpenCL terminology, but the example of FIG. 2 also applies to other computing platforms (e.g., CUDA) despite those other computing platforms using different terminology to describe the same or similar components. For example, the term "compute unit" in OpenCL may refer to a "streaming multiprocessor" in CUDA and "core" in general computer parlance. As another example, the terms "work-item," "subgroup," "work-group," "NDRange," "local memory," and "private memory" in OpenCL may respectively refer to "thread," "warp," "block," "grid," "shared memory," and "local memory" in CUDA. In some examples, the term "thread" may refer to "fiber" and vice versa. As another example, the term "processing element" in OpenCL may refer to "CUDA processor" in CUDA and "lane" in general computer parlance.

The meaning of any term used herein may, in some examples, include any explicit definition as set forth in any computing platform (e.g., OpenCL), or based on the context in which any term is used in any computing platform. For example, OpenCL Specification Version 2.2, Document Revision 06 defines a "compute unit" as being "composed of one or more processing elements and local memory." Accordingly, the term "compute unit" as used herein may refer to one or more processing elements and local memory in some examples. In other examples, the term "compute unit" may mean something different than one or more processing element and local memory. In some examples, the term "work-group" as used herein may refer to a collection of related work-items that execute on a single compute unit, as defined by OpenCL Specification Version 2.2, Document Revision 06. In some examples, the term "subgroup" as used herein may refer to a grouping of work-items within a work group, as defined by OpenCL Specification Version 2.2, Document Revision 06. In some examples, the term "work-item" as used herein may refer to one of a collection of parallel executions of a kernel, as defined by OpenCL Specification Version 2.2, Document Revision 06. As another example, the term "work-item" as used herein may refer to a thread or a fiber according to other computer parlance. In some examples, a work-item may be executed by one or more processing elements as part of a work-group executing on a compute unit.

As shown in the example of FIG. 2, computing device 2 may be configured with a host 20 and one or more compute devices 22. Host 20 and one or more compute devices 22 may include processing unit 1. For example, host 20 may be a CPU (e.g., one type of processing unit 1 as described herein), and one or more compute devices 22 may include one or more GPUs and/or CPUs (e.g., two types of processing unit 1 as described herein). Host 20 may be communicatively coupled to one or more compute devices 22 over one or more buses or over one or more other communication mediums. Each compute device 22 may include one or more compute units 24. Each compute unit 24 may include one or more processing elements 26. Each compute unit 24 may include a memory (e.g., a private memory as this term is defined by the OpenCL computing platform specification). For example, accessible memory space may be allocated to each compute unit. The accessible memory space may be part of one or more physical memories. In some examples, the accessible memory space allocated to each compute unit may include one or more registers, such as general purpose registers. Otherwise stated, in some examples, the memory of each compute unit (e.g., private memory) may be implemented using one or more registers (e.g., general purpose registers (GPRs)). The memory associated with a compute unit may be accessible by the one or more processing elements 26 of that compute unit. In some examples, one or more processing elements 26 may refer to one or more virtual scalar processors on which a work-item may be configured to execute.

In some examples, host 20 may be described as being configured to interact with a context using the OpenCL API. The context may refer to the environment within which kernels execute and the domain in which synchronization and memory management may be defined. In some examples, the context may include a set of devices (e.g., two or more processing units 1), the memory accessible to those devices, the corresponding memory properties and one or more command-queues used to schedule execution of a kernel(s) or operations on memory objects.

Figure 3:
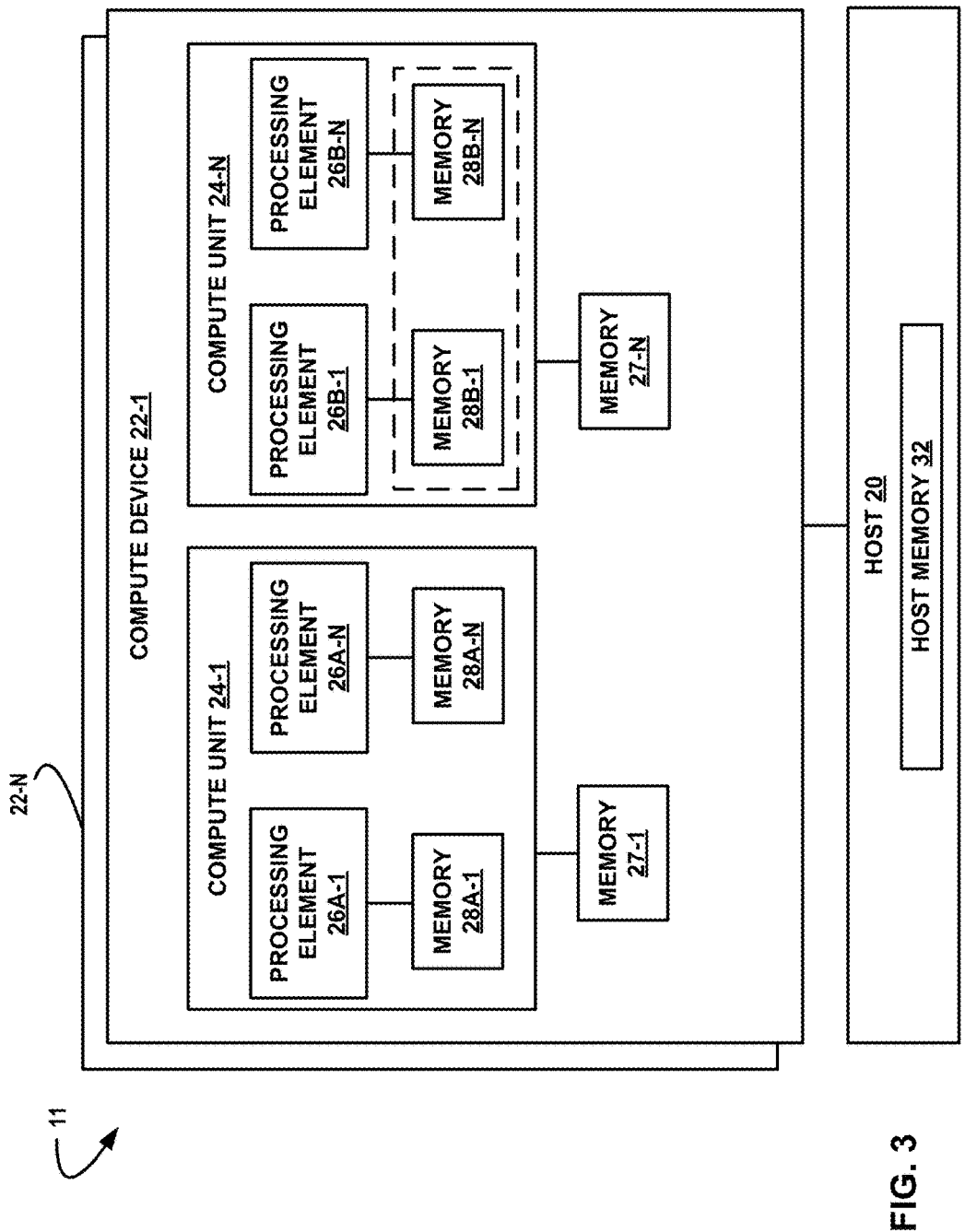
FIG. 3 illustrates example processing units that may be configured to implement the techniques of this disclosure in greater detail.

FIG. 3 illustrates an example of the components shown in FIG. 2 in more detail in the exemplary system (e.g., a heterogeneous system) 11. For example, host 20 is shown as including host memory 32. One or more compute devices 22 are shown as compute device 22-1 and compute device 22-N, where compute device 22-N represents any number of additional compute devices in examples involving more than one compute device 22. One or more compute units 24 are shown as compute unit 24-1 and compute unit 24-N, where compute unit 24-N represents any number of additional compute units in examples involving more than one compute unit 24. Each compute unit 24 may include one or more processing elements 26. In the example of FIG. 2, one or more processing elements 26 of compute unit 24-1 are shown as processing element 26A-1 and processing element 26A-N, where processing element 26A-N represents any number of additional processing elements in examples involving more than one processing element 26 for compute unit 24-1. Similarly, one or more processing elements 26 of compute unit 24-N are shown as processing element 26B-1 and processing element 26N-N, where processing element 26B-N represents any number of additional processing elements in examples involving more than one processing element 26 for compute unit 24-N.

In the example of FIG. 2, each compute device 22 may include a memory (e.g., a local memory as this term is defined by the OpenCL computing platform specification). For example, accessible memory space 27 may be allocated to each compute device. The accessible memory space 27 may be part of one or more physical memories (e.g., one or more internal memories 6). In some examples, the accessible memory space 27 allocated to each compute device 22-1 through 22-N may be accessible through a memory controller, meaning that memory requests issued by a compute unit of the compute device are, in such examples, received and processed by the memory controller. Otherwise stated, access to the local memory of a compute device (e.g., one of compute devices 22-1 through 22-N) may be controlled by a memory controller.

Each compute unit 24 may include a memory (e.g., a private memory as this term is defined by the OpenCL computing platform specification). For example, accessible memory space 28 may be allocated to each compute unit. Memory space 28 (e.g., memory space 28A-1 through 28A-N and memory space 28B-1 through 28BN) may, in some examples, correspond to private memory. The accessible memory space 28 may be part of one or more physical memories (e.g., one or more internal memories 6). In some examples, the accessible memory space allocated to each compute unit 24-1 through 24-N may include one or more registers, such as general purpose registers. Otherwise stated, in some examples, the memory of each compute unit 24-1 through 24-N (e.g., private memory) may be implemented using one or more registers (e.g., general purpose registers (GPRs)). The memory associated with a compute unit may be accessible by the one or more processing elements 26 of that compute unit. The memory associated with a compute unit may be allocated to specific processing elements. For example, memory space 28A-1 may be allocated to processing element 26A-1 for use by processing element 26A-1. Similarly, memory space 28A-1 through 28A-N may be respectively allocated to processing elements 26A-1 through 26A-N for use by processing elements 26A-N. Similarly, memory space 28B-1 may be allocated to processing element 26B-1 for use by processing element 26B-1. Similarly, memory space 28B-1 through 28B-N may be respectively allocated to processing elements 26B-1 through 26B-N for use by processing elements 26B-N. The memory space allocated to each processing element 26 may not overlap. For example, any registers allocated to processing element 26A-1 may not be allocated to processing element 26A-N. In some examples, one or more processing elements 26 may refer to one or more virtual scalar processors on which a work-item may be configured to execute.

Processing unit 1 may be configured to perform synchronization for a plurality of work-items using one or more barriers. In some examples, processing unit 1 may be configured to perform synchronization for a plurality of work-items using one or more barriers by executing the one or more barriers. Processing unit 1 may be configured to perform synchronization for a plurality of work-items of a work-group using one or more barriers (e.g., the work-group barrier as defined by the OpenCL computing platform). In some examples, processing unit 1 may be configured to perform synchronization for all work-items of a work-group using one or more barriers (e.g., the work-group barrier as defined by the OpenCL computing platform). As another example, processing unit 1 may be configured to perform synchronization for a plurality of work-items of a subgroup using one or more barriers (e.g., the subgroup barrier as defined by the OpenCL computing platform). In some examples, processing unit 1 may be configured to perform synchronization for all work-items of a subgroup using one or more barriers (e.g., the subgroup barrier and/or the named barrier as defined by the OpenCL computing platform).

In some examples, a first barrier may be executed by processing unit 1 to synchronize one or more work-items of a first subgroup and one or more work-items of a second subgroup. Synchronization of the one or more work-items of the first subgroup and the one or more work-items of the second subgroup may indicate that data is ready to be consumed in, for example, a producer-consumer relationship. For example, one or more of the work-items of the first subgroup and/or one or more work-items of the second group may have produced data during execution and stored the produced data in an accessible memory location. Once synchronized, processing unit 1 may be configured to perform, for example, an inter-subgroup data transfer between the first subgroup and the second subgroup. Processing unit 1 may be configured to execute a second barrier that synchronizes the one or more work-items of the first subgroup and the one or more work-items of the second subgroup to ensure the inter-subgroup data transfer is complete before allowing the one or more work-items of the first subgroup and the one or more work-items of the second subgroup to proceed in execution past the second barrier. In some examples, the second barrier may be described as ensuring the data transfer is complete (e.g., the produced data has been consumed by a consumer). Once the one or more work-items of the first subgroup and the one or more work-items of the second subgroup to proceed in execution past the second barrier, memory locations (e.g., registers allocated to memory locations) corresponding to the one or more work-items of the first subgroup and the one or more work-items of the second subgroup may, in some examples, be re-allocated to, for example, different work-items that may or may not correspond to a different subgroup and/or workgroup. The techniques described herein enable processing unit 1 to re-use limited memory resources (e.g., registers) by using one or more barriers to enable the sharing of data between two different subgroups, and then re-using (e.g., re-allocating) the registers after the inter-subgroup data transfer.

As used herein, a barrier may, in some examples, refer to a function that synchronizes two or more work-items. For example, a barrier may synchronize two or more work-items by stopping further execution of the two or more work-items until each work-item of the two or more work-items have reached (e.g., executed) the barrier. Once the two or more work-items have reached (e.g., executed) the barrier, the barrier is conceptually lifted and the work-items may then continue executing. It is understood that a work-group barrier may, in some examples, refer to a function that synchronizes all work-items of a work-group. For example, a work-group barrier may halt or otherwise pause the execution of each work-item of a work-group until all work-items of the work-group have reached (e.g., executed) the work-group barrier. Once all work-items of the work-group have reached (e.g., executed) the work-group barrier, the work-group barrier is conceptually lifted and all work-items of the work-group may then continue executing. Similarly, it is understood that a subgroup barrier may, in some examples, refer to a function that synchronizes all work-items of a subgroup (e.g., a subgroup of work-items of a work-group). For example, a subgroup barrier may halt or otherwise pause the execution of each work-item of a subgroup until all work-items of the subgroup have reached (e.g., executed) the subgroup barrier. Once all work-items of the subgroup have reached (e.g., executed) the subgroup barrier, the subgroup barrier is conceptually lifted and all work-items of the subgroup may then continue executing.

It is to be understood that reference to processing unit 1 being configured to perform any step, function, feature, method, and the like described herein may refer to, in some examples, processing unit 1 being configured to execute one or more instructions that cause the described step, function, feature, method and the like. In some examples, the one or more instructions may be stored on a memory accessible to processing unit 1. As an example, reference to processing unit 1 being configured to perform any step, function, feature, method, and the like described herein may refer to, in some examples, any compute device, compute unit, and/or processing element of processing unit 1 being configured to execute one or more instructions that cause the described step, function, feature, method and the like. In some examples, the one or more instructions may be stored on a memory accessible to compute device(s), compute unit(s), and/or processing element(s). Processing unit 1 may be configured to perform an intra-subgroup data transfer between work-items corresponding to the same subgroup. For example, processing unit 1 may be configured with an intra-subgroup data transfer mechanism that may be invoked, executed, or otherwise used to perform the intra-subgroup data transfer.

As used herein, a data transfer may refer to moving data, copying data, sharing data, and the like. Similarly, reference to sharing data may refer to transferring data, moving data, copying data, and the like. For example, inter-subgroup data sharing referred to herein may also be referred to as inter-subgroup data moving, inter-subgroup data copying, inter-subgroup data transferring. For example, an inter-subgroup data transfer is synonymous with an inter-subgroup data share. As another example, an inter-subgroup data transfer is synonymous with an inter-subgroup data copy. As another example, intra-subgroup data sharing referred to herein may also be referred to as intra-subgroup data moving, intra-subgroup data copying, intra-subgroup data transferring. For example, an intra-subgroup data transfer is synonymous with an intra-subgroup data share. As another example, an intra-subgroup data transfer is synonymous with an intra-subgroup data copy.

In some examples, the intra-subgroup data transfer mechanism may include what industry has termed an intra-subgroup shuffle mechanism, such as the cl_intel_subgroups API as defined by the OpenCL computing platform specification (e.g., OpenCL Extension #35). However, the intra-subgroup data transfer mechanism is limited in that it only allows for the transferring of data between work-items belonging to the same subgroup regardless of whether one or more barriers are used. For example, even though the intra-subgroup shuffle mechanism of cl_intel_subgroup of the OpenCL computing platform allows work-items in the same subgroup to share data without the use of local memory and barriers, the intra-subgroup data transfer mechanism does not allow for the sharing of data between work-items belonging to different subgroups.

This disclosure describes one or more techniques for enabling inter-subgroup data transfer between work-items of different subgroups (e.g., processing unit 1 may be configured with such one or more techniques). For example, this disclosure describes one or more new functions that may be implemented in software, hardware, or a combination thereof to enable inter-subgroup data transfer. In some examples, the one or more new functions may include an API. The function enabling inter-subgroup data transfer may be referred to as an inter-subgroup data transfer function, an inter-subgroup copy function, an inter-subgroup share function, and the like. In some examples, the inter-subgroup data transfer function may refer to the data transfer between registers (e.g., general purpose registers). In other examples, the inter-subgroup data transfer function may refer to the data transfer between any memory space (e.g., any memory location) allocated to different subgroups. For example, the memory space allocated to different subgroups may include the memory space allocated in the private memory of a compute unit, which may or may not utilize one or more registers.

In examples where one or more techniques described herein may be implemented using software (e.g., any functions and/or API described herein), the instructions corresponding to such software may be stored on a memory (e.g., a memory of processing unit 1, which may be described as a computer-readable storage medium) accessible to processing unit 1 that, when executed by processing unit 1 (e.g., by a processing element of processing unit 1), cause the processing unit 1 to perform the described features. For example, processing unit 1 may be configured with an inter-subgroup data transfer mechanism that may be invoked, executed, or otherwise used to perform the inter-subgroup data transfer. In examples where the inter-subgroup data transfer mechanism is implemented using software, processing unit 1 may be configured to execute one or more instructions corresponding to the inter-subgroup data transfer mechanism stored on a memory (e.g., a memory of processing unit 1, which may be described as a computer-readable storage medium) accessible to processing unit 1.

In some examples, the inter-subgroup data transfer function may be implemented in conjunction with one or more barriers (e.g., one or more subgroup barriers, such as named barriers in OpenCL and fbarriers in HSA (e.g., fbarriers as defined by the Heterogeneous System Architecture Foundation). A subgroup barrier is lighter than workgroup barriers since subgroups can, for example, synchronize pairwise, meaning that while some subgroups wait or stall on the subgroup barrier, other subgroups can proceed with execution. Accordingly, this disclosure describes one or more techniques for enabling inter-subgroup data transfer between work-items corresponding to subgroups of different subgroups where the subgroups are synchronized using a subgroup barrier (e.g., processing unit 1 may be configured with such one or more techniques). For example, a work-group may include 16 subgroups. In one example, processing unit 1 may be configured to synchronize subgroups 1-8 using a first subgroup barrier, and may be configured to synchronize subgroups 9-16 using a second subgroup barrier.

In one example, the inter-subgroup data function may have the following syntax: gentype copy(gentype variable, int subgroup_id, int named_barrier_id). In this example, the inter-subgroup data function may include three input parameters: variable, subgroup_id, and named_barrier_id. Variable may refer to a memory location (e.g., a private memory location), which may be allocated in a register (e.g., a GPR). In an example where the variable refers to a register (e.g., a GPR), then this variable may indicate which register contains the data that will be copied or shared. Subgroup_id may refer to an identification number (e.g., an ID) assigned to or otherwise corresponding to a subgroup. Named_barrier_id may refer to an ID assigned to or otherwise corresponding to a barrier (e.g., a named barrier such as that defined by the OpenCL computing platform or an fbarrier such as that defined by the HSA computing platform.

For example, take the example foo=copy(bar, 5, bar3) where variable=bar, subgroup_id=5, and named_barrier_id=bar3. In this example, the source memory space (e.g., the source register) from which data is to be copied may correspond to the memory space allocated to bar, and the destination memory space (e.g., the destination register(s)) to which data is to be copied may correspond to the memory space where foo is allocated.

In some examples, both subgroup_id and named_barrier_id may be subgroup-uniform, meaning that these two input parameters may contain the same value for each work-item in a subgroup. The following example code is used to describe this:

```
int foo;
if(sub_group_local_id( ) ==5 ){
   subgroup_id = 3;
}
else{
   subgroup_id = 7;
}
foo = copy(bar, subgroup_id, bar3);
```

In this example, subgroup_id is not subgroup-uniform since work-item #5 wants to copy data from subgroup_id=7 while all other work-items in the same subgroup want to copy data from subgroup_id=5. However, named barrier (i.e., the named barrier corresponding to the specified named_barrier_id) is subgroup-uniform since it is bar3 for all work-items. It is to be understood that subgroup_id and/or named_barrier_id may or may not be subgroup-uniform.

Figures 4, 5:
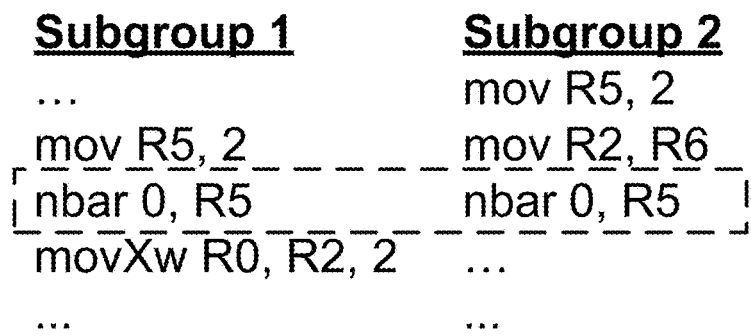
FIG. 4 illustrates one example of a synchronization technique according to this disclosure.
FIG. 5 illustrates one example of a synchronization technique according to this disclosure.

In another example, an inter-subgroup data transfer may be enabled using a movXw Instruction Set Architecture (ISA)) instruction. For example, processing unit 1 may be configured to share data between registers (e.g., general purpose registers) corresponding to different work-items of different subgroups with the movXw ISA instruction, which may have the following syntax: movXw Rd, Rs, srcSubgroupId. One or more barriers (e.g., named barriers) may surround the movXw instruction. For example, an inter-subgroup data transfer may be enabled using a movXw along with a new IDS instruction of nbar ID, Rx where ID operates as the barrier identifier and Rx specifies the number of subgroups. In one example implementation, each named barrier (e.g., nbar) may be associated with a counter by the barrier identifier (i.e., ID). Each counter associated with each nbar ID may initialize at 0. For each nbar ID, the counter corresponding thereto may increment by 1 upon N instructions. For a particular nbar, the nbar may block (e.g., stall) execution of work-items corresponding to a subgroup until the counter corresponding to the nbar reaches the value of N. Once the value of N is reached, the counter may be reset to 0 and the work-items corresponding to any subgroups that were stalled by the barrier are released (e.g., the work-items may proceed in their execution). FIG. 4 shows one example of synchronization with nbar used for moving data between subgroups by movXw. In the example of FIG. 4, subgroup 2's R2 is copied to subgroup 1's RO.

In another example, the inter-subgroup data function may have the following syntax:

```
gentype wg_shuffle
(
   gentype var,
   int srcSubgroupId,
   int srcSubgroupLocalId,
   named_barrier bar
)
```

The wg_shuffle function may copy data from a specified variable var of a specified subgroup srcSubgroupId and a specified work-item from that subgroup (srcSubgroupLocalId) using a specified barrier bar (e.g., a named barrier bar) for synchronization. In some examples, the wg_shuffle function may be implemented as follows:

```
{
   gentype tmp, ret;
   bar.wait( );
   tmp = inter_subgroup_copy( srcSubgroupId)
   bar.wait( );
   ret = intra_subgroup_shuffle ( srcSubgroupLocalId, tmp);
   return ret;
}
```

In some examples, processing unit 1 may be configured to implement any functions and/or implementation details described herein using a single hardware instruction.

In another example, the inter-subgroup data function may have the following syntax: gentype subgroup_exchange (gentype var, int srcSubgroupId). In this example, the inter-subgroup data function may include two input parameters: var and srcSubgroupId. Var may refer to a memory location (e.g., a private memory location), which may be allocated in a register (e.g., a GPR). As used herein, a register may refer to a hardware register. In an example where the variable refers to a register (e.g., a GPR), then this variable may indicate which register contains the data that will be copied or shared. srcSubgroupId may refer to an identification number (e.g., an ID) assigned to or otherwise corresponding to a subgroup. For example, three subgroups having IDs 0, 1, and 2 may do a circular exchange on a subgroup barrier K in the example shown in FIG. 5. In some examples, every work-item within a subgroup must participate in the data transfer specified by the function. In other examples, not every work-item within a subgroup must participate in the data transfer specified by the function because the data transfer function may be embedded into a conditional control flow. In such examples, even though the data transfer specified by the function may be defined such that every work-item within a subgroup would appear to participate in the data transfer specified by the function, some work-items may not take a particular branch in the conditional control flow; and, therefore, would not participate in the data transfer.

In some examples, srcSubgroupId may be uniform across each subgroup, meaning that srcSubgroupID may contain the same value for each work-item in a subgroup. Otherwise stated, with srcSubgroupId being subgroup-uniform, this means that all work-items in the subgroup would copy data from the same source subgroup. In the example shown in FIG. 5, this code conveys that circular data transfer may be implemented across three subgroups. For example, data from subgroup 1 may be copied to subgroup 1, data from subgroup 2 may be copied to subgroup 1, and data from subgroup 0 may be copied to subgroup 2. In some examples, a circular data transfer may be implemented with a single instruction. It is to be understood that each work-item may have its own copy of all registers, logically.

The data transfer (e.g., exchange) between subgroups may be implemented using directional identifiers. For example, the data transfer between subgroups may be implemented using up and down identifiers. In such an example, up may indicate from subgroup_id=N to subgroup_id=N+1 in modular pattern, and down may indicate from subgroup_id=N to subgroup_id=N−1. In some examples, an xor pattern may be used. As used herein, an xor pattern may refer to a data pattern that indicates that data will be exchanged within groups (e.g., subgroups). For example, xor 1 means that work-items may exchange data in the following pattern: 0⇔1, 2⇔3, 4⇔5, etc.

In some examples, the inter-subgroup data function and/ or an intra- and inter-subgroup data function may be implemented using these directional identifiers and/or the xor pattern. For example, the inter-subgroup data function may have the following syntax: gentype sub_group_exchange_{up|down|xor}(gentype var, int count, named_barrier*barrier_array). In this example, the inter-subgroup data function may include four input parameters: var, count, named_barrier, and barrier_array. Var may refer to a memory location (e.g., a private memory location), which may be allocated in a register (e.g., a GPR). In an example where the variable refers to a register (e.g., a GPR), then this variable may indicate which register contains the data that will be copied or shared. Count may indicate a power-of-2 constant that may be used for computing a roll-over. For example, if count is 8 and operation is "up", then the exchange pattern will be "0=>1, 1=>2, . . . , 7=>0, 8=>9, . . . , 15=>8, 16=>17, . . . " Barrier_array may indicate an array of named barriers that will be used. For example, if operation is "up" and subgroup size is 32, and the count (previous parameter) is 8, then 4 named barriers may need to be used (e.g., each group of 8 adjacent subgroups will be using an independent named barrier).

This disclosure describes one or more techniques for combining the intra-subgroup data transfer techniques with inter-subgroup data transfer techniques to enable data transfer between any work-items that do or do not belong to the same subgroup (e.g., processing unit 1 may be configured with such one or more techniques). For example, the inter-subgroup data transfer techniques described herein may be implemented in conjunction with an intra-subgroup data transfer technique (e.g., cl_intel_subgroup) to enable data transfer between any work-items that do or do not belong to the same subgroup. As another example, this disclosure describes one or more new functions that may be implemented in software, hardware, or a combination thereof to enable intra- and inter-subgroup data transfer. In such an example, this disclosure describes examples of a single function that may be implemented in software, hardware, or a combination thereof to enable intra- and/or inter-subgroup data transfer. This single function may have the following syntax: Gentype sub_group_shuffle_{up|down|xor}_ exchange_{up|down|xor}(gentype var, Int shuffle_cnt, Int subgroup_cnt). It is to be understood that the { } represent BNF notation. Accordingly, the single function identified above represents 9 different possibilities from this single function, such as sub_group_shuffle_up_exchange_up(gentype var, Int shuffle_cnt, Int subgroup_cnt), sub_group_ shuffle_up_exchange_down(gentype var, Int shuffle_cnt, Int subgroup_cnt), and sub_group_shuffle_xor_exhange_xor (gentype var, Int shuffle_cnt, Int subgroup_cnt). Shuffle is used to indicate an intra-subgroup data transfer and exchange is used to indicate an inter-subgroup data transfer.

As indicated above, this single function may be implemented using directional identifiers. For example, the data transfer between subgroups may be implemented using up and down identifiers. In such an example, up may indicate from work-subgroup_id=N to subgroup_id=N+1 in modular pattern, and down may indicate from subgroup_id=N to subgroup_id=N−1. In some examples, an xor pattern may be used.

Processing unit 1 may be configured to perform an inter-subgroup data transfer between work-items corresponding to different subgroups. For example, processing unit 1 may be configured with an inter-subgroup data transfer mechanism that may be invoked, executed, or otherwise used to perform the inter-subgroup data transfer. As another example, processing unit 1 may be configured with a data transfer mechanism that may invoked, executed, or otherwise used to perform inter- and/or intra-subgroup data transfer between different subgroups and/or the same subgroup, respectively. As used herein, a data transfer may refer to moving data, copying data, sharing data, and the like. Similarly, reference to sharing data may refer to transferring data, moving data, copying data, and the like.

Figure 6:
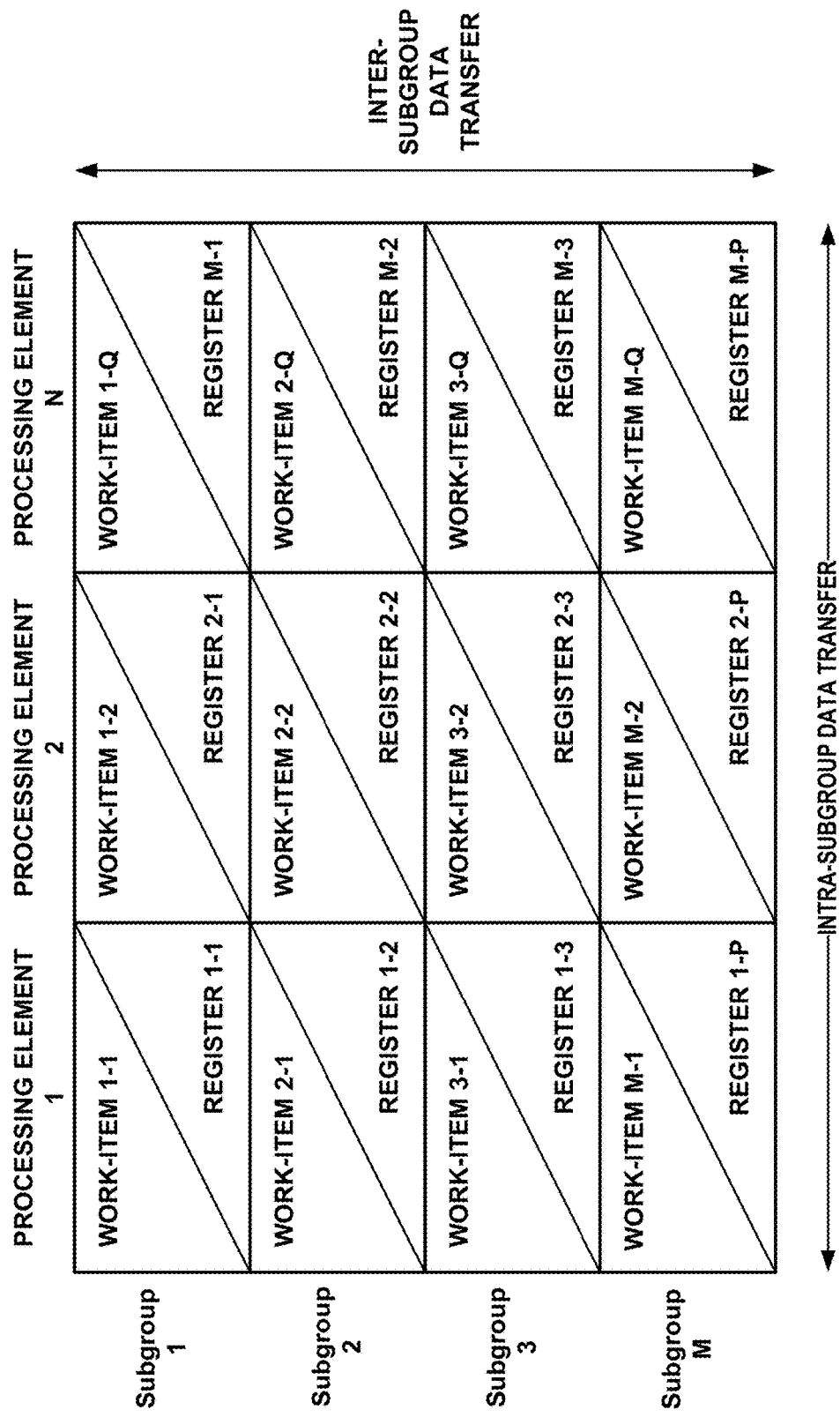
FIG. 6 illustrates an example of work-item processing according to the techniques described herein.

FIG. 6 illustrates an example of subgroup processing according to the techniques described herein. In the example of FIG. 6, processing unit 1 may be configured to execute one or more subgroups (e.g., subgroup 1 to subgroup M where M is an integer) on or more processing elements (e.g., PE 1 to PE N where N is an integer). More specifically, processing unit 1 may be configured to execute one or more work-items on the one or more processing elements 26 (for example, processing elements 1-N may each be a processing element from processing elements 26A-1 through 26A-N on compute unit 24-1), where the one or more work-items correspond to the one or more subgroups. As shown, each subgroup includes one or more work-items. For example, the one or more work-items of subgroup 1 in FIG. 6 are represented by work-item 1-1, work-item 1-2, and work-item 1-Q, where Q is an integer. Similarly, the one or more work-items of subgroup 2 in FIG. 6 are represented by work-item 2-1, work-item 2-2, and work-item 2-Q, where Q is an integer. Similarly, the one or more work-items of subgroup 3 in FIG. 6 are represented by work-item 3-1, work-item 3-2, and work-item 3-Q, where Q is an integer. Similarly, the one or more work-items of subgroup M (where M is an integer) in FIG. 6 are represented by work-item M-1, work-item M-2, and work-item M-Q, where Q is an integer.

Each work-item may be processed using a processing element of processing unit 1, and each processing element may include a bank of one or more registers (e.g., general purpose registers). For example, processing elements 1, 2, and N (each of which may be a different processing element 26 of the same or different compute unit 24 described herein) are shown in FIG. 6 as including a different register for each work-item, meaning that a different register (e.g., a GPR) may be allocated to each work-item. Processing element N, where N is an integer, represents any processing element number. For example, processing element 1 may include one or more registers 1-1, 1-2, 1-3, and 1-P (where P is an integer) that may be respectively allocated to work-items 1-1, 2-1, 3-1, and M-1. Similarly, processing element 2 may include one or more registers 2-1, 2-2, 2-3, and 2-P (where P is an integer) that may be respectively allocated to work-items 1-2, 2-2, 3-2, and M-2. Similarly, processing element M may include one or more registers M-1, M-2, M-3, and M-P (where M and P are each an integer) that may be respectively allocated to work-items 1-Q, 2-Q, 3-Q, and M-Q (where M and Q are each an integer).

Processing unit 1 may be configured with one or more techniques described herein to transfer data between registers corresponding to work-items in different subgroups, as is depicted by the up and down arrows on the right side of FIG. 6 labeled as inter-subgroup data transfer. Processing unit 1 may be configured with one or more techniques described herein to transfer data between registers corresponding to work-items in the same subgroup, as is depicted by the arrows on the bottom of FIG. 6 labeled as intra-subgroup data transfer. Otherwise stated, processing unit 1 may be configured to perform data transfer horizontally or vertically.

Figure 7:
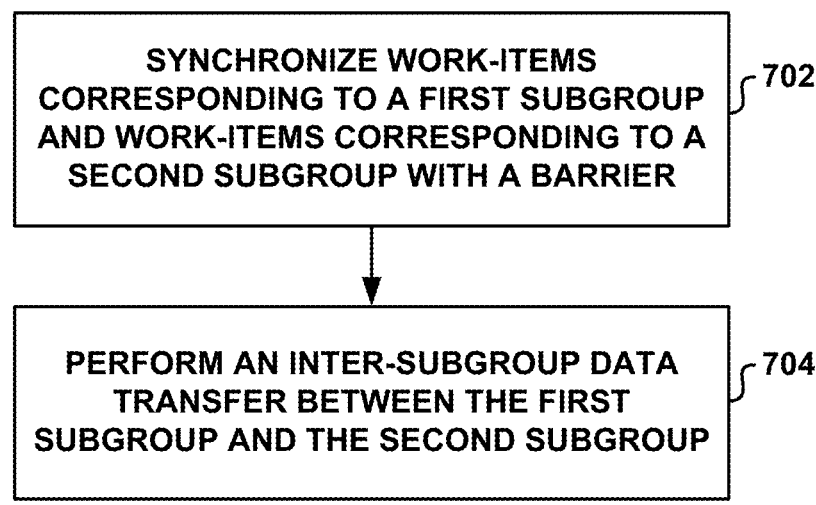
FIG. 7 is a flowchart showing an example method of the disclosure.

FIG. 7 is a flowchart showing an example method of the disclosure. The method of FIG. 7 may be carried out by one or more processing units 1 (e.g., one or more CPUs, one or more GPUs, one or more parallel processing units (e.g., any processing unit configured to perform parallel processing), one or more SoCs, or any combinations thereof). FIG. 7 depicts one example method consistent with one or more techniques of this disclosure.

Processing unit 1 may be configured to synchronize work-items corresponding to a first subgroup and work-items corresponding to a second subgroup with a barrier (702). In some examples, the processing unit may include one or more compute units. Each of the one or more compute units may include one or more processing elements. The processing unit may include local memory accessible by each of the one or more compute units.

Processing unit 1 may be configured to perform an inter-subgroup data transfer between the first subgroup and the second subgroup (704). In some examples, processing unit 1 may be configured to perform the inter-subgroup data transfer between the first subgroup and the second subgroup without using the local memory. In some examples, the inter-subgroup data transfer may include copying data from the first subgroup to the second subgroup or copying data from the second subgroup to the first subgroup. In some examples, the inter-subgroup data transfer may include copying data from a first memory location (e.g., a first register) associated with the first subgroup (e.g., a first memory location allocated to the first subgroup, a first memory location allocated to a work-item of the first subgroup, and the like) to a second memory location (e.g., a second register) associated with the second subgroup (e.g., a second memory location allocated to the second subgroup, a second memory location allocated to a work-item of the second subgroup, and the like) or copying data from the second memory location (e.g., the second register) associated with the second subgroup to the first memory location (e.g., the first register) associated with the first subgroup. The first memory location and/or the second memory location may include one or more registers. For example, the first memory location may be a general purpose register, and the second memory location may be a general purpose register. The first memory location and the second memory location may correspond to memory space allocated to a processing element of a compute unit of the processing unit. For example, first memory location and the second memory location may correspond to private memory space allocated to the processing element.

In some examples, the inter-subgroup data transfer may include copying data from one or more work-items corresponding to the first subgroup to one or more work-items corresponding to the second subgroup or copying data from the one or more work-items corresponding to the second subgroup to the one or more work-items corresponding to the first subgroup. In some examples, the inter-subgroup data transfer may include copying data from one or more memory locations (e.g., one or more registers) associated with one or more work-items corresponding to the first subgroup to one or more memory locations (e.g., one or more registers) associated with one or more work-items corresponding to the second subgroup or copying data from the one or more memory locations (e.g., one or more registers) associated with the one or more work-items corresponding to the second subgroup to the one or more memory locations (e.g., one or more registers) associated with the one or more work-items corresponding to the first subgroup. The one or more memory locations (e.g., one or more registers) associated with one or more work-items corresponding to the first subgroup and the one or more memory locations (e.g., one or more registers) associated with one or more work-items corresponding to the second subgroup may be general purpose registers. The one or more memory locations may correspond to memory space allocated to a processing element of a compute unit of the processing unit. For example, the one or more memory locations may correspond to private memory space allocated to the processing element.

In some examples, the work-items corresponding to the first subgroup may correspond to a first work-group (e.g., the work-items may belong to the first subgroup which may belong to the first work-group), and the work-items corresponding to the second subgroup may correspond to a second work-group (e.g., the work-items may belong to the second subgroup which may belong to the second work-group). In other examples, the work-items corresponding to the first subgroup may correspond to a first work-group (e.g., the work-items may belong to the first subgroup which may belong to the first work-group), and the work-items corresponding to the second subgroup may correspond to the first work-group (e.g., the work-items may belong to the second subgroup which may belong to the first work-group).

As described above, processing unit 1 may be configured to synchronize work-items corresponding to a first subgroup and work-items corresponding to a second subgroup with a barrier. In some examples, the barrier may be a named barrier or any subgroup barrier. In some examples, the named barrier may be one type of subgroup barrier. For example, the named barrier and a subgroup barrier may include work_group_named_barrier (uint sub_group_count). In this example, sub_group_count may indicate a number of subgroups in a work-group to be synchronized where the first subgroup and the second subgroup belong to the work work-group. As another example, the named barrier and any subgroup barrier may include cl_khr_sub_group_named_barrier, as defined by the OpenCL computing platform specification (e.g., OpenCL C++ Specification, Version 1.0, Document Revision 22).

In some examples, processing unit 1 may be configured to perform the inter-subgroup data transfer using an inter-subgroup data transfer mechanism. In some examples, the inter-subgroup data transfer mechanism may include a software function executable by the processing unit. The software function may be an API function. In some examples, the software function may include one or more atomic operations. In other examples, the software function may include only an atomic operation (e.g., a single atomic operation). In other examples, the software function may include only a plurality of atomic operations.

In some examples, the inter-subgroup data transfer between the first subgroup and the second subgroup occurs simultaneously. For example, transferring data from the first subgroup to the second subgroup and transferring data from the second subgroup to the first subgroup may occur simultaneously.

In some examples, the software function corresponding to the inter-subgroup data transfer mechanism (e.g., an API function) may include gentype copy(gentype variable, int subgroup_id, int named_barrier_id). In other examples, the API function may include gentype generalized_shuffle(gentype variable, int fiber_id, int subgroup_id, int named_barrier_id). In other examples, the API function may include gentype subgroup_exchange(gentype var, int srcSubgroupId). In other examples, the API function may include gentype sub_group_exchange_{up|down|xor}(gentype var, int count, named_barrier*barrier_array). In other examples, the API function may include gentype sub_group_shuffle_{up|down|xor}_exchange_{up|down| xor}(gentype var, int shuffle_cnt, int subgroup_cnt). In other examples, the API function may include gentype generalized_shuffle(gentype variable, int workitem_id, int subgroup_id, int named_barrier_id).

In some examples, processing unit 1 may be configured to perform the inter-subgroup data transfer between the first subgroup and the second subgroup without using any memory controller of the processing unit. In some examples, processing unit 1 may be configured to perform the inter-subgroup data transfer between the first subgroup and the second subgroup without sending a memory request to any memory controller of the processing unit.

In some examples, processing unit 1 may be configured to perform an intra-subgroup data transfer between a first work-item of the first subgroup and a second work-item of the first subgroup, or between a first work-item of the second subgroup and a second work-item of the second subgroup. The intra-subgroup data transfer does not transfer data between different subgroups. For example, the intra-subgroup data transfer does not transfer data between work-items belonging to different subgroups.

Processing unit 1 may be configured to perform the intra-subgroup data transfer using an intra-subgroup data transfer mechanism. The intra-subgroup data transfer mechanism may include a software function executable by the processing unit. The software function may be an API function. In some examples, the API function may include gentype sub_group_shuffle_{up|down|xor}_exchange_{up|down|xor}(gentype var, int shuffle_cnt, int subgroup_cnt).

Figure 8:
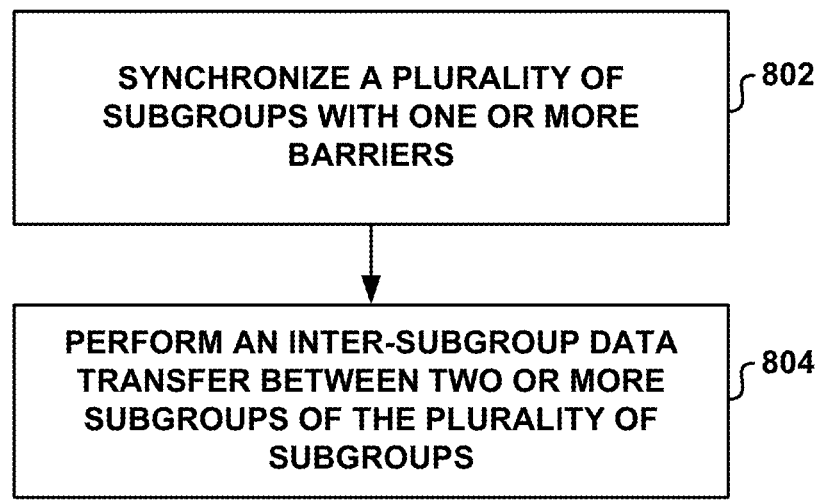
FIG. 8 is a flowchart showing an example method of the disclosure.

FIG. 8 is a flowchart showing an example method of the disclosure. The method of FIG. 8 may be carried out by one or more processing units 1 (e.g., one or more CPUs, one or more GPUs, one or more parallel processing units (e.g., any processing unit configured to perform parallel processing), one or more SoCs, or any combinations thereof). FIG. 8 depicts one example method consistent with one or more techniques of this disclosure.

Processing unit 1 may be configured to synchronize a plurality of subgroups with one or more barriers (802). In some examples, the processing unit may include one or more compute units. Each of the one or more compute units may include one or more processing elements. The processing unit may include local memory accessible by each of the one or more compute units. In some examples, the plurality of subgroups may belong to a single work-group. In some examples, the plurality of subgroups may include two subgroups, three subgroups, four subgroups, five subgroups, six subgroups, seven subgroups, or eight subgroups. In other examples, the plurality of subgroups may include one or more subgroups.

Processing unit 1 may be configured to perform an inter-subgroup data transfer between two or more subgroups of the plurality of subgroups (804). In some examples, processing unit 1 may be configured to perform the inter-subgroup data transfer between two or more subgroups of the plurality of subgroups without using the local memory. In some examples, the inter-subgroup data transfer may include copying data from at least one subgroup of the plurality of subgroups to one or more other subgroups of the plurality of subgroups. In some examples, the inter-subgroup data transfer may include copying data from at least one subgroup of the plurality of subgroups to one or more other subgroups of the plurality of subgroups according to an xor pattern. In such examples, the inter-subgroup data transfer between the at least one subgroup of the plurality of subgroups and the one or more other subgroups of the plurality of subgroups may occur simultaneously.

Processing unit 1 may be configured to perform the inter-subgroup data transfer between one or more subgroups of the plurality of subgroups simultaneously. For example, any data transfer between one or more subgroups may occur simultaneously. Processing unit 1 may be configured to perform the inter-subgroup data transfer between two or more work-items of different subgroups simultaneously. For example, any data transfer between one or more work-items of a first subgroup and one or more work-items of one or more subgroups different from the first subgroup may occur simultaneously.

In some examples, the inter-subgroup data transfer may include at least one of: copying data from the first subgroup to the second subgroup, or copying data from the second subgroup to the first subgroup. In such examples, the plurality of subgroups may include two or more subgroups.

In some examples, the inter-subgroup data transfer may include at least one of: copying data from the first subgroup to the second subgroup, copying data from the first subgroup to the third subgroup, copying data from the second subgroup to the first subgroup, copying data from the second subgroup to the third subgroup, copying data from the third subgroup to the first subgroup, or copying data from the third subgroup to the second subgroup. In such examples, the plurality of subgroups may include three or more subgroups.

In some examples, the inter-subgroup data transfer according to the xor pattern may include: copying data from the first subgroup to the second subgroup, copying data from the second subgroup to the third subgroup, and copying data from the third subgroup to the first subgroup. In such examples, the plurality of subgroups may include three or more subgroups.

In some examples, the inter-subgroup data transfer includes at least one of: copying data from the first subgroup to the second subgroup, copying data from the first subgroup to the third subgroup, copying data from the first subgroup to the fourth subgroup, copying data from the second subgroup to the first subgroup, copying data from the second subgroup to the third subgroup, copying data from the second subgroup to the fourth subgroup, copying data from the third subgroup to the first subgroup, copying data from the third subgroup to the second subgroup, copying data from the third subgroup to the fourth subgroup, copying data from the fourth subgroup to the first subgroup, copying data from the fourth subgroup to the second subgroup, or copying data from the fourth subgroup to the third subgroup. In such examples, the plurality of subgroups may include four or more subgroups.

In some examples, the inter-subgroup data transfer according to the xor pattern may include: copying data from the first subgroup to the second subgroup, copying data from the second subgroup to the first subgroup, copying data from the third subgroup to the fourth subgroup, and copying data from the fourth subgroup to the third subgroup. In such examples, the plurality of subgroups may include four or more subgroups.

In other examples, the inter-subgroup data transfer according to the xor pattern may include: copying data from the first subgroup to the second subgroup, copying data from the second subgroup to the third subgroup, copying data from the third subgroup to the fourth subgroup, and copying data from the fourth subgroup to the first subgroup. In such examples, the plurality of subgroups may include four or more subgroups.

In some examples, the plurality of subgroups may include two, three, four, five, six, seven, eight, or more subgroups. In such examples, the inter-subgroup data transfer may include at least one of: (1) copying data from a first subgroup to at least one of a second subgroup, a third subgroup, a fourth subgroup, a fifth subgroup, a sixth subgroup, a seventh subgroup, or an eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (2) copying data from the second subgroup to at least one of the first subgroup, the third subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (3) copying data from the third subgroup to at least one of the first subgroup, the second subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (4) copying data from the fourth subgroup to at least one of the first subgroup, the second subgroup, the third subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (5) copying data from the fifth subgroup to at least one of the first subgroup, the second subgroup, the third subgroup, the fourth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (6) copying data from the sixth subgroup to at least one of the first subgroup, the second subgroup, the third subgroup, the fourth subgroup, the fifth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (7) copying data from the seventh subgroup to at least one of the first subgroup, the second subgroup, the third subgroup, the fourth subgroup, the fifth subgroup, the sixth subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; or (8) copying data from the eighth subgroup to at least one of the first subgroup, the second subgroup, the third subgroup, the fourth subgroup, the fifth subgroup, the sixth subgroup, or the seventh subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups.

In some examples, the plurality of subgroups may include two, three, four, five, six, seven, eight, or more subgroups. In such examples, the inter-subgroup data transfer may include at least one of: (1) copying data from one or more memory locations (e.g., one or more registers) associated with a first subgroup to at least one memory location (e.g., register) associated with a second subgroup, a third subgroup, a fourth subgroup, a fifth subgroup, a sixth subgroup, a seventh subgroup, or an eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (2) copying data from one or more memory locations (e.g., one or more registers) associated with the second subgroup to at least one memory location (e.g., register) associated with the first subgroup, the third subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (3) copying data from one or more memory locations (e.g., one or more registers) associated with the third subgroup to at least one memory location (e.g., register) associated with the third subgroup to at least one register associated with the first subgroup, the second subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (4) copying data from one or more memory locations (e.g., one or more registers) associated with the fourth subgroup to at least one memory location (e.g., register) associated with the fourth subgroup to at least one register associated with the first subgroup, the second subgroup, the third subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (5) copying data from one or more memory locations (e.g., one or more registers) associated with the fifth subgroup to at least one memory location (e.g., register) associated with the first subgroup, the second subgroup, the third subgroup, the fourth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (6) copying data from one or more memory locations (e.g., one or more registers) associated with the sixth subgroup to at least one memory location (e.g., register) associated with the first subgroup, the second subgroup, the third subgroup, the fourth subgroup, the fifth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; (7) copying data from one or more memory locations (e.g., one or more registers) associated with the seventh subgroup to at least one memory location (e.g., register) associated with the first subgroup, the second subgroup, the third subgroup, the fourth subgroup, the fifth subgroup, the sixth subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; or (8) copying data from one or more memory locations (e.g., one or more registers) associated with the eighth subgroup to at least one memory location (e.g., register) associated with the first subgroup, the second subgroup, the third subgroup, the fourth subgroup, the fifth subgroup, the sixth subgroup, or the seventh subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups. The one or more memory locations may correspond to memory space allocated to a processing element of a compute unit of the processing unit. For example, the one or more memory locations may correspond to private memory space allocated to the processing element.

In some examples, the inter-subgroup data transfer may include copying data from one or more memory locations (e.g., one or more registers) associated with the two or more subgroups of the plurality of subgroups to one or more other memory locations (e.g., one or more other registers) associated with the two or more subgroups of the plurality of subgroups. The one or more memory locations (e.g., one or more registers) associated with the two or more subgroups and the one or more other memory locations (e.g., one or more other registers) associated with the two or more subgroups may include general purpose registers. The one or more memory locations may correspond to memory space allocated to a processing element of a compute unit of the processing unit. For example, the one or more memory locations may correspond to private memory space allocated to the processing element.

In some examples, processing unit 1 may be configured to synchronize a plurality of subgroups with one or more barriers may include the processing unit 1 being configured to synchronize one or more work-items corresponding to each subgroup of the plurality of subgroups. In such examples, processing unit 1 may be configured to perform the inter-subgroup data transfer between two or more subgroups of the plurality of subgroups by being configured to perform the inter-subgroup data transfer between two or more work-items of the two or more subgroups, where at least two of the two or more work-items belong to different subgroups of two or more groups.

In some examples, the inter-subgroup data transfer includes copying data from one or more memory locations (e.g., one or more registers) associated with one or more work-items of at least one subgroup of the plurality of subgroups to one or more memory locations (e.g., one or more registers) associated with one or more other work-items of one or more other subgroups of the plurality of subgroups. In such examples, the one or more memory locations (e.g., one or more registers) associated with one or more work-items of at least one subgroup of the plurality of subgroups and the one or more memory locations (e.g., one or more registers) associated with one or more other work-items of one or more other subgroups of the plurality of subgroups may include general purpose registers. The one or more memory locations may correspond to memory space allocated to a processing element of a compute unit of the processing unit. For example, the one or more memory locations may correspond to private memory space allocated to the processing element.

As described above, processing unit 1 may be configured to synchronize a plurality of subgroups with one or more barriers. The one or more barriers may include one or more subgroup barriers. In some examples, the one or more barriers may include one or more named barriers and/or one or more subgroup barriers. In some examples, a named barrier may be one type of subgroup barrier. Processing unit 1 may be configured to synchronize a plurality of subgroups with one or more named barriers and/or one or more subgroup barriers. In some examples, the one or more named barriers and/or one or more subgroup barriers may include work_group_named_barrier (uint sub_group_count). In such examples, sub_group_count may indicate a number of subgroups in a work-group to be synchronized. As another example, the one or more named barriers and/or one or more subgroup barriers may include cl_khr_sub_group_named_barrier, as defined by the OpenCL computing platform specification (e.g., OpenCL C++ Specification, Version 1.0, Document Revision 22).

In some examples, processing unit 1 may be configured to perform the inter-subgroup data transfer using an inter-subgroup data transfer mechanism. In some examples, the inter-subgroup data transfer mechanism may include a software function executable by the processing unit. The software function may be an API function. In some examples, the software function may include one or more atomic operations. In other examples, the software function may include only an atomic operation (e.g., a single atomic operation). In other examples, the software function may include only a plurality of atomic operations.

In some examples, the inter-subgroup data transfer between the two or more subgroups of the plurality of subgroups occurs simultaneously. For example, transferring data from a first subgroup to a second subgroup and transferring data from the second subgroup to the first subgroup may occur simultaneously.

In some examples, the software function corresponding to the inter-subgroup data transfer mechanism (e.g., an API function) may include gentype copy(gentype variable, int subgroup_id, int named_barrier_id). In other examples, the API function may include gentype generalized_shuffle(gentype variable, int fiber_id, int subgroup_id, int named_barrier_id). In other examples, the API function may include gentype subgroup_exchange(gentype var, int srcSubgroupId). In other examples, the API function may include gentype sub_group_exchange_{up|down|xor}(gentype var, int count, named_barrier*barrier_array). In other examples, the API function may include gentype sub_group_shuffle_{up|down|xor}_exchange_{up|down|xor}(gentype var, int shuffle_cnt, int subgroup_cnt). In other examples, the API function may include gentype generalized_shuffle(gentype variable, int workitem_id, int subgroup_id, int named_barrier_id).

In some examples, processing unit 1 may be configured to perform the inter-subgroup data transfer between two or more subgroups of the plurality of subgroups without using any memory controller of the processing unit. In some examples, processing unit 1 may be configured to perform the inter-subgroup data transfer between two or more subgroups of the plurality of subgroups without sending a memory request to any memory controller of the processing unit.

In some examples, processing unit 1 may be configured to perform an intra-subgroup data transfer between two or more work-items within a single subgroup of the plurality of subgroups. In some examples, processing unit 1 may be configured to perform an intra-subgroup data transfer between two or more work-items within each subgroup of the plurality of subgroups where the intra-subgroup data transfer does not transfer data between work-items belonging to different subgroups.

Processing unit 1 may be configured to perform the intra-subgroup data transfer using an intra-subgroup data transfer mechanism. The intra-subgroup data transfer mechanism may include a software function executable by the processing unit. The software function may be an API function. In some examples, the API function may include gentype sub_group_shuffle_{up|down|xor}_exchange_{up|down|xor}(gentype var, int shuffle_cnt, int subgroup_cnt).

Figure 9:
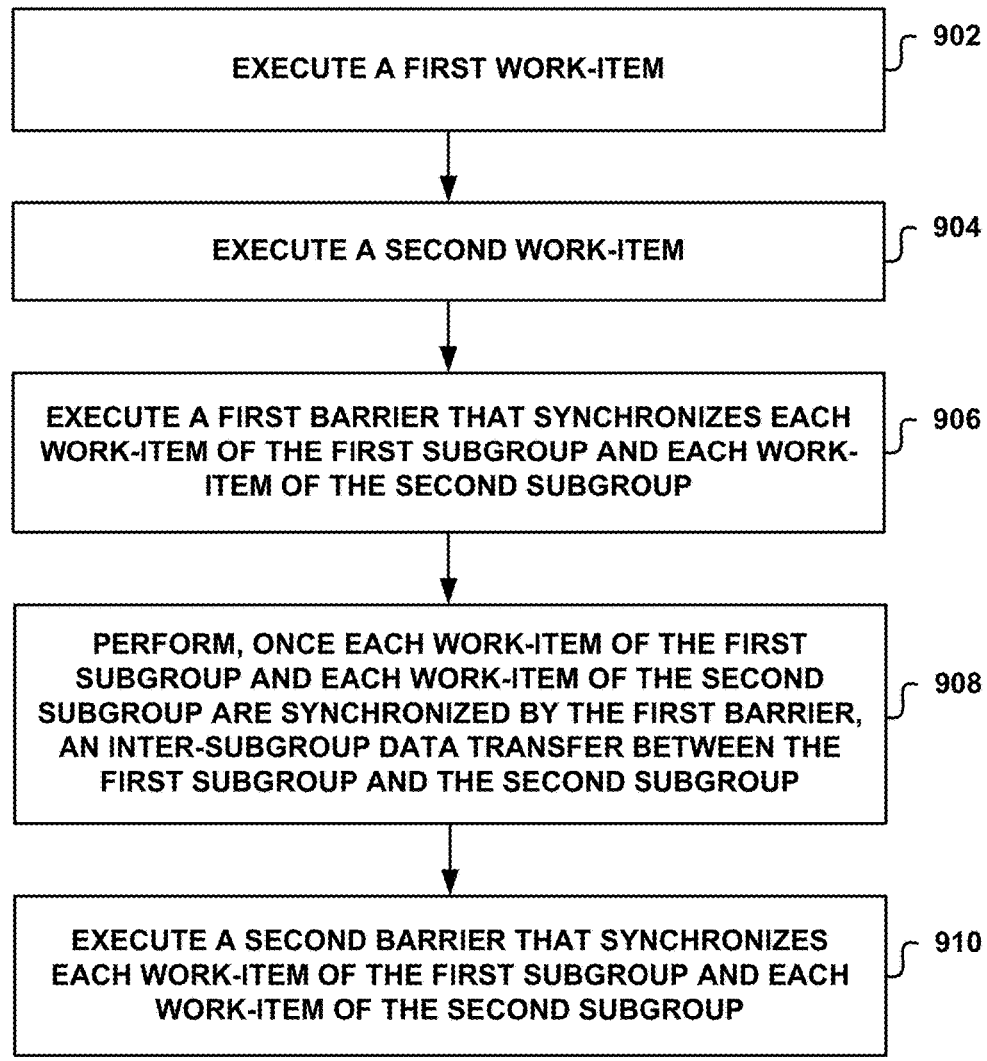
FIG. 9 is a flowchart showing an example method of the disclosure.

FIG. 9 is a flowchart showing an example method of the disclosure. The method of FIG. 9 may be carried out by one or more processing units 1 (e.g., one or more CPUs, one or more GPUs, one or more parallel processing units (e.g., any processing unit configured to perform parallel processing), one or more SoCs, or any combinations thereof). FIG. 9 depicts one example method consistent with one or more techniques of this disclosure.

Processing unit 1 may be configured to execute a first work-item (902). The first work-item may correspond to a first subgroup. Processing unit 1 may be configured to execute a second work-item (904). The second work-item may correspond to a second subgroup. Processing unit 1 may be configured to execute a first barrier that synchronizes each work-item of the first subgroup and each work-item of the second subgroup (906). Processing unit 1 may be configured to perform, once each work-item of the first subgroup and each work-item of the second subgroup are synchronized by the first barrier, an inter-subgroup data transfer between the first subgroup and the second subgroup (908). Processing unit 1 may be configured to execute a second barrier that synchronizes each work-item of the first subgroup and each work-item of the second subgroup (910). For example, processing unit 1 may be configured to execute a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

In some examples, processing unit 1 may include one or more compute units. Each of the one or more compute units may include one or more processing elements for executing work-items. Processing unit 1 may include a local memory (e.g., as part of one or more internal memories 6) accessible by each of the one or more compute units. Processing unit 1 may include a private memory (e.g., as part of one or more internal memories 6) accessible by each of the one or more processing elements. In some examples, processing unit 1 may be configured to performing the inter-subgroup data transfer between the first subgroup and the second subgroup without using the local memory or a global memory, and/or processing unit 1 may be configured to perform the inter-subgroup data transfer between the first subgroup and the second subgroup using the private memory.

In some examples, processing unit 1 may be configured perform the inter-subgroup data transfer by being configured to perform at least one of: copy data from a first memory location associated with the first subgroup to a second memory location associated with the second subgroup; or copy data from the second memory location associated with the second subgroup to the first memory location associated with the first subgroup. The first memory location may be a first hardware register and the second memory location may be a second hardware register. The first hardware register may be associated with the first work-item and the second hardware register may be associated with the second work-item.

In some examples, processing unit 1 may be configured to perform the inter-subgroup data transfer by being configured to perform at least one of: copy data from one or more hardware registers associated with one or more work-items corresponding to the first subgroup to one or more hardware registers associated with one or more work-items corresponding to the second subgroup; or copy data from the one or more hardware registers associated with the one or more work-items corresponding to the second subgroup to the one or more hardware registers associated with the one or more work-items corresponding to the first subgroup.

In some examples, processing unit 1 may be configured to perform the inter-subgroup data transfer by being configured to use an inter-subgroup data transfer mechanism. The inter-subgroup data transfer mechanism may include a software function executable by the processing unit. The software function may be an Application Programming Interface (API) function. The Application Programming Interface (API) function may include at least one of: gentype copy (gentype variable, int subgroup_id, int named_barrier_id); gentype generalized_shuffle(gentype variable, int fiber_id, int subgroup_id, int named_barrier_id); gentype sub-group_exchange(gentype var, int srcSubgroupId); gentype sub_group_exchange_{up|down|xor}(gentype var, int count, named_barrier*barrier_array); gentype sub_group_shuffle_{up|down|xor}_exchange_{up|down|xor}(gentype var, int shuffle_cnt, int subgroup_cnt); or gentype generalized_shuffle(gentype variable, int workitem_id, int subgroup_id, int named_barrier_id).

In some examples, processing unit 1 may be configured to perform the inter-subgroup data transfer between the first subgroup and the second subgroup without using any memory controller of the processing unit or accessible by the processing unit. Similarly, processing unit 1 may be configured to perform the inter-subgroup data transfer between the first subgroup and the second subgroup without sending a memory request to any memory controller of the processing unit or accessible by the processing unit.

In some examples, processing unit 1 may be configured to perform an intra-subgroup data transfer between a second work-item of the first subgroup and a third work-item of the first subgroup, or between a second work-item of the second subgroup and a third work-item of the second subgroup.

Processing unit 1 may be configured to perform one or more techniques described in this disclosure. For example, processing unit 1 may be configured to perform any technique or techniques described in this disclosure.

The following numbered examples may illustrate one or more aspects of the disclosure:

Example 1

A method comprising: synchronizing, by a processing unit, work-items corresponding to a first subgroup and work-items corresponding to a second subgroup with a barrier; and performing, by the processing unit, an inter-subgroup data transfer between the first subgroup and the second subgroup.

Example 2

The method of example 2, wherein the processing unit includes one or more compute units, wherein each of the one or more compute units includes one or more processing elements, and wherein the processing unit includes local memory accessible by each of the one or more compute units.

Example 3

The method of example 2, further comprising: performing the inter-subgroup data transfer between the first subgroup and the second subgroup without using the local memory.

Example 4

The method of example 1, wherein the inter-subgroup data transfer includes copying data from the first subgroup to the second subgroup or copying data from the second subgroup to the first subgroup.

Example 5

The method of example 1, wherein the inter-subgroup data transfer includes copying data from a first register associated with the first subgroup to a second register associated with the second subgroup or copying data from the second register associated with the second subgroup to the first register associated with the first subgroup.

Example 6

The method of example 5, wherein the first register is a general purpose register and the second register is a general purpose register.

Example 7

The method of example 1, wherein the inter-subgroup data transfer includes copying data from one or more work-items corresponding to the first subgroup to one or more work-items corresponding to the second subgroup or copying data from the one or more work-items corresponding to the second subgroup to the one or more work-items corresponding to the first subgroup.

Example 8

The method of example 1, wherein the inter-subgroup data transfer includes copying data from one or more registers associated with one or more work-items corresponding to the first subgroup to one or more registers associated with one or more work-items corresponding to the second subgroup or copying data from the one or more registers associated with the one or more work-items corresponding to the second subgroup to the one or more registers associated with the one or more work-items corresponding to the first subgroup.

Example 9

The method of example 8, wherein the one or more registers associated with one or more work-items corresponding to the first subgroup and the one or more registers associated with one or more work-items corresponding to the second subgroup are general purpose registers.

Example 10

The method of any combination of examples 1, 7, 8, or 9, wherein the work-items corresponding to the first subgroup correspond to a first work-group, and the work-items corresponding to the second subgroup correspond to a second work-group.

Example 11

The method of any combination of examples 1, 7, 8, or 9, wherein the work-items corresponding to the first subgroup correspond to a first work-group, and the work-items corresponding to the second subgroup correspond to the first work-group.

Example 12

The method of example 1, wherein the barrier is a named_barrier.

Example 13

The method of example 12, wherein the named_barrier includes work_group_named_barrier (uint sub_group_count) or cl_khr_sub_group_named_barrier.

Example 14

The method of example 13, wherein sub_group_count indicates a number of subgroups in a work-group to be synchronized, wherein the first subgroup and the second subgroup belong to the work work-group.

Example 15

The method of example 1, wherein the barrier is a subgroup barrier.

Example 16

The method of example 15, wherein the subgroup barrier includes work_group_named_barrier (uint sub_group_count) or
cl_khr_sub_group_named_barrier.

Example 17

The method of example 16, wherein sub_group_count indicates a number of subgroups in a work-group to be synchronized, wherein the first subgroup and the second subgroup belong to the work work-group.

Example 18

The method of any combination of examples 1-17, further comprising performing the inter-subgroup data transfer using an inter-subgroup data transfer mechanism.

Example 19

The method of example 18, wherein the inter-subgroup data transfer mechanism includes a software function executable by the processing unit.

Example 20

The method of example 19, wherein the software function is an API function.

Example 21

The method of example 20, wherein the API function includes gentype copy(gentype variable, int subgroup_id, int named_barrier_id).

Example 22

The method of example 20, wherein the API function includes gentype generalized_shuffle(gentype variable, int fiber_id, int subgroup_id, int named_barrier_id).

Example 23

The method of example 20, wherein the API function includes gentype subgroup_exchange(gentype var, int src-SubgroupId).

Example 24

The method of example 20, wherein the API function includes gentype sub_group_exchange_{up|down|xor} (gentype var, int count, named_barrier*barrier_array).

Example 25

The method of example 20, wherein the API function includes gentype sub_group_shuffle_{up|down|xor}_exchange_{up|down|xor}(gentype var, int shuffle_cnt, int subgroup_cnt).

Example 26

The method of example 20, wherein the API function includes gentype generalized_shuffle(gentype variable, int workitem_id, int subgroup_id, int named_barrier_id).

Example 27

The method of example 1, wherein the processing unit is a CPU or a GPU.

Example 28

The method of example 1, wherein the processing unit is a single instruction multiple data (SIMD) processor, a multiple instruction multiple data (MIMD) processor, a single program multiple data (SPMD) processor, or a multiple program multiple data (MPMD) processor.

Example 29

The method of example 1, further comprising: performing the inter-subgroup data transfer between the first subgroup and the second subgroup without using any memory controller of the processing unit.

Example 30

The method of example 1, further comprising: performing the inter-subgroup data transfer between the first subgroup and the second subgroup without sending a memory request to any memory controller of the processing unit.

Example 31

The method of example 1, further comprising: performing, by the processing unit, an intra-subgroup data transfer between a first work-item of the first subgroup and a second work-item of the first subgroup, or between a first work-item of the second subgroup and a second work-item of the second subgroup.

Example 32

The method of example 31, further comprising performing the intra-subgroup data transfer using an intra-subgroup data transfer mechanism.

Example 33

The method of example 32, wherein the intra-subgroup data transfer mechanism includes a software function executable by the processing unit.

Example 34

The method of example 33, wherein the software function is an API function.

Example 35

The method of example 34, wherein the API function includes gentype sub_group_shuffle_{up|down|xor}_exchange_{up|down|xor}(gentype var, int shuffle_cnt, int subgroup_cnt).

Example 36

The method of example 18, wherein the inter-subgroup data transfer mechanism includes a software function executable by the processing unit, and wherein the software function includes one or more atomic operations.

Example 37

The method of example 18, wherein the inter-subgroup data transfer mechanism includes a software function executable by the processing unit, and wherein the software function includes only an atomic operation.

Example 38

The method of example 18, wherein the inter-subgroup data transfer mechanism includes a software function executable by the processing unit, and wherein the software function includes only a plurality of atomic operations.

Example 39

The method of any combination of examples 1-38, wherein the inter-subgroup data transfer between the first subgroup and the second subgroup occurs simultaneously.

Example 40

A method comprising: synchronizing, by a processing unit, a plurality of subgroups with one or more barriers; and performing, by the processing unit, an inter-subgroup data transfer between two or more subgroups of the plurality of subgroups.

Example 41

The method of example 40, wherein the plurality of subgroups belong to a single work-group.

Example 42

The method of example 40, wherein the processing unit includes one or more compute units, wherein each of the one or more compute units includes one or more processing elements, and wherein the processing unit includes local memory accessible by each of the one or more compute units.

Example 43

The method of example 42, further comprising: performing the inter-subgroup data transfer between two or more subgroups of the plurality of subgroups without using the local memory.

Example 44

The method of example 40, wherein the inter-subgroup data transfer includes copying data from at least one subgroup of the plurality of subgroups to one or more other subgroups of the plurality of subgroups.

Example 45

The method of example 40, wherein the inter-subgroup data transfer includes copying data from at least one subgroup of the plurality of subgroups to one or more other subgroups of the plurality of subgroups according to an xor pattern.

Example 46

The method of example 44 or 45, wherein the inter-subgroup data transfer includes at least one of: copying data from the first subgroup to the second subgroup; or copying data from the second subgroup to the first subgroup.

Example 47

The method of example 44 or 45, wherein the inter-subgroup data transfer includes at least one of: copying data from the first subgroup to the second subgroup; copying data from the first subgroup to the third subgroup; copying data from the second subgroup to the first subgroup; copying data from the second subgroup to the third subgroup; copying data from the third subgroup to the first subgroup; or copying data from the third subgroup to the second subgroup.

Example 48

The method of example 45, wherein the inter-subgroup data transfer according to the xor pattern includes: copying data from the first subgroup to the second subgroup; copying data from the second subgroup to the third subgroup; and copying data from the third subgroup to the first subgroup.

Example 49

The method of example 44 or 45, wherein the inter-subgroup data transfer includes at least one of: copying data from the first subgroup to the second subgroup; copying data from the first subgroup to the third subgroup; copying data from the first subgroup to the fourth subgroup; copying data from the second subgroup to the first subgroup; copying data from the second subgroup to the third subgroup; copying data from the second subgroup to the fourth subgroup; copying data from the third subgroup to the first subgroup; copying data from the third subgroup to the second subgroup; copying data from the third subgroup to the fourth subgroup; copying data from the fourth subgroup to the first subgroup; copying data from the fourth subgroup to the second subgroup; or copying data from the fourth subgroup to the third subgroup.

Example 50

The method of example 45, wherein the inter-subgroup data transfer according to the xor pattern includes: copying data from the first subgroup to the second subgroup; copying data from the second subgroup to the first subgroup; copying data from the third subgroup to the fourth subgroup; and copying data from the fourth subgroup to the third subgroup.

Example 51

The method of example 45, wherein the inter-subgroup data transfer according to the xor pattern includes: copying data from the first subgroup to the second subgroup; copying data from the second subgroup to the third subgroup; copying data from the third subgroup to the fourth subgroup; and copying data from the fourth subgroup to the first subgroup.

Example 52

The method of example 44 or 45, wherein the inter-subgroup data transfer between the at least one subgroup of the plurality of subgroups and the one or more other subgroups of the plurality of subgroups occurs simultaneously.

Example 53

The method of example 40, wherein the plurality of subgroups includes two, three, four, five, six, seven, eight, or more subgroups, and wherein the inter-subgroup data transfer includes at least one of: copying data from a first subgroup to at least one of a second subgroup, a third subgroup, a fourth subgroup, a fifth subgroup, a sixth subgroup, a seventh subgroup, or an eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the second subgroup to at least one of the first subgroup, the third subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the third subgroup to at least one of the first subgroup, the second subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the fourth subgroup to at least one of the first subgroup, the second subgroup, the third subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the fifth subgroup to at least one of the first subgroup, the second subgroup, the third subgroup, the fourth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the sixth subgroup to at least one of the first subgroup, the second subgroup, the third subgroup, the fourth subgroup, the fifth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from the seventh subgroup to at least one of the first subgroup, the second subgroup, the third subgroup, the fourth subgroup, the fifth subgroup, the sixth subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; or copying data from the eighth subgroup to at least one of the first subgroup, the second subgroup, the third subgroup, the fourth subgroup, the fifth subgroup, the sixth subgroup, or the seventh subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups.

Example 54

The method of example 40, wherein the plurality of subgroups includes two, three, four, five, six, seven, eight, or more subgroups, and wherein the inter-subgroup data transfer includes at least one of: copying data from one or more registers associated with a first subgroup to at least one register associated with a second subgroup, a third subgroup, a fourth subgroup, a fifth subgroup, a sixth subgroup, a seventh subgroup, or an eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the second subgroup to at least one register associated with the first subgroup, the third subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the third subgroup to at least one register associated with the first subgroup, the second subgroup, the fourth subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the fourth subgroup to at least one register associated with the first subgroup, the second subgroup, the third subgroup, the fifth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the fifth subgroup to at least one register associated with the first subgroup, the second subgroup, the third subgroup, the fourth subgroup, the sixth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the sixth subgroup to at least one register associated with the first subgroup, the second subgroup, the third subgroup, the fourth subgroup, the fifth subgroup, the seventh subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; copying data from one or more registers associated with the seventh subgroup to at least one register associated with the first subgroup, the second subgroup, the third subgroup, the fourth subgroup, the fifth subgroup, the sixth subgroup, or the eighth subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups; or copying data from one or more registers associated with the eighth subgroup to at least one register associated with the first subgroup, the second subgroup, the third subgroup, the fourth subgroup, the fifth subgroup, the sixth subgroup, or the seventh subgroup of the plurality of subgroups with each of the first, second, third, fourth, fifth, sixth, seventh, and eighth subgroups only being available if the plurality of subgroups includes a requisite number of subgroups such that the first, second, third, fourth, fifth, sixth, seventh, and eighth subgroup exists in the plurality of subgroups.

Example 55

The method of example 40, wherein the one or more barriers include one or more named barriers.

Example 56

The method of example 55, wherein the one or more named barriers include work_group_named_barrier (uint sub_group_count) or
cl_khr_sub_group_named_barrier.

Example 57

The method of example 56, wherein sub_group_count indicates a number of subgroups in a work-group to be synchronized.

Example 58

The method of example 40, wherein the one or more barriers include one or more subgroup barriers.

Example 59

The method of example 59, wherein the one or more subgroup barriers include work_group_named_barrier (uint sub_group_count) or
cl_khr_sub_group_named_barrier.

Example 60

The method of example 60, wherein sub_group_count indicates a number of subgroups in a work-group to be synchronized.

Example 61

The method of any combination of examples 40-60, further comprising performing the inter-subgroup data transfer using an inter-subgroup data transfer mechanism.

Example 62

The method of example 61, wherein the inter-subgroup data transfer mechanism includes a software function executable by the processing unit.

Example 63

The method of example 62, wherein the software function is an API function.

Example 64

The method of example 63, wherein the API function includes gentype copy(gentype variable, int subgroup_id, int named_barrier_id).

Example 65

The method of example 63, wherein the API function includes gentype generalized_shuffle(gentype variable, int fiber_id, int subgroup_id, int named_barrier_id).

Example 66

The method of example 63, wherein the API function includes gentype subgroup_exchange(gentype var, int src-SubgroupId).

Example 67

The method of example 63, wherein the API function includes gentype sub_group_exchange_{up|down|xor} (gentype var, int count, named_barrier*barrier_array).

Example 68

The method of example 63, wherein the API function includes gentype sub_group_shuffle_{up|down|xor}_exchange_{up|down|xor}(gentype var, int shuffle_cnt, int subgroup_cnt).

Example 69

The method of example 63, wherein the API function includes gentype generalized_shuffle(gentype variable, int workitem_id, int subgroup_id, int named_barrier_id).

Example 70

The method of example 40, wherein the processing unit is a CPU or a GPU.

Example 71

The method of example 40, wherein the processing unit is a single instruction multiple data (SIMD) processor, a multiple instruction multiple data (MIMD) processor, a single program multiple data (SPMD) processor, or a multiple program multiple data (MPMD) processor.

Example 72

The method of example 40, further comprising: performing the inter-subgroup data transfer between two or more subgroups of the plurality of subgroups without using any memory controller of the processing unit; or performing the inter-subgroup data transfer between two or more subgroups of the plurality of subgroups without sending a memory request to any memory controller of the processing unit.

Example 73

The method of example 40, further comprising: performing, by the processing unit, an intra-subgroup data transfer between two or more work-items within a single subgroup of the plurality of subgroups.

Example 74

The method of example 40, further comprising: performing, by the processing unit, an intra-subgroup data transfer between two or more work-items within each subgroup of the plurality of subgroups, wherein the intra-subgroup data transfer does not transfer data between work-items belonging to different subgroups.

Example 75

The method of example 73 or 74, further comprising performing the intra-subgroup data transfer using an intra-subgroup data transfer mechanism.

Example 76

The method of example 75, wherein the intra-subgroup data transfer mechanism includes a software function executable by the processing unit.

Example 77

The method of example 76, wherein the software function is an API function.

Example 78

The method of example 77, wherein the API function includes gentype sub_group_shuffle_{up|down|xor}_exchange_{up|down|xor}(gentype var, int shuffle_cnt, int subgroup_cnt).

Example 79

The method of example 61, wherein the inter-subgroup data transfer mechanism includes a software function executable by the processing unit, and wherein the software function includes one or more atomic operations.

Example 80

The method of example 61, wherein the inter-subgroup data transfer mechanism includes a software function executable by the processing unit, and wherein the software function includes only an atomic operation.

Example 81

The method of example 61, wherein the inter-subgroup data transfer mechanism includes a software function executable by the processing unit, and wherein the software function includes only a plurality of atomic operations.

Example 82

The method of any combination of examples 40-81, wherein the plurality of subgroups includes two subgroups, three subgroups, four subgroups, five subgroups, six subgroups, seven subgroups, or eight subgroups.

Example 83

The method of any combination of examples 40-82, wherein the inter-subgroup data transfer includes copying data from one or more registers associated with the two or more subgroups of the plurality of subgroups to one or more other registers associated with the two or more subgroups of the plurality of subgroups.

Example 84

The method of example 83, wherein the one or more registers associated with the two or more subgroups and the one or more other registers associated with the two or more subgroups include general purpose registers.

Example 85

The method of any combination of examples 40-84, wherein synchronizing a plurality of subgroups with one or more barriers includes synchronizing one or more work-items corresponding to each subgroup of the plurality of subgroups.

Example 86

The method of example 85, wherein performing the inter-subgroup data transfer between two or more subgroups of the plurality of subgroups includes performing the inter-subgroup data transfer between two or more work-items of the two or more subgroups, wherein at least two of the two or more work-items belong to different subgroups of two or more groups.

Example 87

The method of any combination of examples 85 or 86, wherein the inter-subgroup data transfer includes copying data from one or more registers associated with one or more work-items of at least one subgroup of the plurality of subgroups to one or more registers associated with one or more other work-items of one or more other subgroups of the plurality of subgroups.

Example 88

The method of example 87, wherein the one or more registers associated with one or more work-items of at least one subgroup of the plurality of subgroups and the one or more registers associated with one or more other work-items of one or more other subgroups of the plurality of subgroups include general purpose registers.

Example 89

The method of any combination of examples 40-88, wherein the inter-subgroup data transfer between one or more subgroups of the plurality of subgroups occurs simultaneously.

Example 90

The method of any combination of examples 40-88, wherein the inter-subgroup data transfer between two or more work-items occurs simultaneously.

Example 91

A method comprising any combination of examples 1-39.

Example 92

A method comprising any combination of examples 40-90.

Example 93

A method comprising any combination of examples 1-90.

Example 94

A method comprising one or more techniques described in this disclosure.

Example 95

Any device described in this disclosure.

Example 96

A device comprising: a memory; and one or more processing units configured to perform one or more techniques described in this disclosure.

Example 97

A device comprising: a memory; and one or more processing units configured to perform the method of combination of examples 1-39 and 94.

Example 98

A device comprising: a memory; and one or more processing units configured to perform the method of combination of examples 40-90 and 94.

Example 99

A device comprising: a memory; and one or more processing units configured to perform the method of combination of examples 1-94.

Example 100

An apparatus comprising one or more means for performing the method of any combination of examples 1-39 and 94.

Example 101

An apparatus comprising one or more means for performing the method of any combination of examples 40-90 and 94.

Example 102

An apparatus comprising one or more means for performing the method of any combination of examples 1-94.

Example 103

An apparatus comprising one or more means for performing one or more techniques described in this disclosure.

Example 104

The apparatus of example 100, 101, 102, or 103, wherein the one or more means comprises one or more processing units.

Example 105

The apparatus of example 104, wherein the one or more processing units include at least one of: one or more CPUs or one or more GPUs.

Example 106

The apparatus of example 104, wherein the one or more processing units include at least one of: a single instruction multiple data (SIMD) processor, a multiple instruction multiple data (MIMD) processor, a single program multiple data (SPMD) processor, or a multiple program multiple data (MPMD) processor.

Example 107

A computer-readable storage medium having storing instructions thereon that, when executed, cause one or more processing units to perform the method of any combination of examples 1-39 and 94.

Example 108

A computer-readable storage medium having storing instructions thereon that, when executed, cause one or more processing units to perform the method of any combination of examples 40-90 and 94.

Example 109

A computer-readable storage medium having storing instructions thereon that, when executed, cause one or more processing units to perform the method of any combination of examples 1-94.

Example 110

A computer-readable storage medium having storing instructions thereon that, when executed, cause one or more processing units to perform one or more techniques described in this disclosure.

Example 111

Any processing unit described in this disclosure.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   executing, by a processing unit, a first work-item, wherein the first work-item corresponds to a first subgroup;
   executing, by the processing unit, a second work-item, wherein the second work-item corresponds to a second subgroup;
   executing, by the processing unit, a first barrier that synchronizes each work-item of the first subgroup and each work-item of the second subgroup;
   performing, by the processing unit once each work-item of the first subgroup and each work-item of the second subgroup are synchronized by the first barrier, an inter-subgroup data transfer between the first subgroup and the second subgroup; and
   executing, by the processing unit, a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

2. The method of claim 1, wherein the processing unit includes one or more compute units, wherein each of the one or more compute units includes one or more processing elements for executing work-items, wherein the processing unit includes a local memory accessible by each of the one or more compute units, and wherein the processing unit includes a private memory accessible by each of the one or more processing elements.

3. The method of claim 2, further comprising at least one of:
   performing the inter-subgroup data transfer between the first subgroup and the second subgroup without using the local memory or a global memory; or
   performing the inter-subgroup data transfer between the first subgroup and the second subgroup using the private memory.

4. The method of claim 1, wherein performing the inter-subgroup data transfer comprises at least one of:
   copying data from a first memory location associated with the first subgroup to a second memory location associated with the second subgroup; or
   copying data from the second memory location associated with the second subgroup to the first memory location associated with the first subgroup.

5. The method of claim 4, wherein the first memory location is a first hardware register and the second memory location is a second hardware register.

6. The method of claim 5, wherein the first hardware register is associated with the first work-item and the second hardware register is associated with the second work-item.

7. The method of claim 1, wherein performing the inter-subgroup data transfer comprises at least one of:
   copying data from one or more hardware registers associated with one or more work-items corresponding to the first subgroup to one or more hardware registers associated with one or more work-items corresponding to the second subgroup; or
   copying data from the one or more hardware registers associated with the one or more work-items corresponding to the second subgroup to the one or more hardware registers associated with the one or more work-items corresponding to the first subgroup.

8. The method of claim 1, further comprising performing the inter-subgroup data transfer using an inter-subgroup data transfer mechanism, wherein the inter-subgroup data transfer mechanism includes a software function executable by the processing unit, wherein the software function is an Application Programming Interface (API) function, and wherein the Application Programming Interface (API) function includes at least one of:

gentype copy(gentype variable, int subgroup_id, int named_barrier_id);

gentype generalized_shuffle(gentype variable, int fiber_id, int subgroup_id, int named_barrier_id);

gentype subgroup_exchange(gentype var, int srcSubgroupId);

gentype sub_group_exchange_{up|down|xor}(gentype var, int count, named_barrier*barrier_array);

gentype sub_group_shuffle_{up|down|xor}_exchange_{up|down|xor}(gentype var, int shuffle_cnt, int subgroup_cnt); or gentype generalized_shuffle(gentype variable, int workitem_id, int subgroup_id, int named_barrier_id).

9. The method of claim 1, further comprising:
performing the inter-subgroup data transfer between the first subgroup and the second subgroup without using any memory controller of the processing unit or accessible by the processing unit.

10. The method of claim 1, further comprising:
performing the inter-subgroup data transfer between the first subgroup and the second subgroup without sending a memory request to any memory controller of the processing unit or accessible by the processing unit.

11. The method of claim 1, further comprising:
performing, by the processing unit, an intra-subgroup data transfer between a second work-item of the first subgroup and a third work-item of the first subgroup, or between a second work-item of the second subgroup and a third work-item of the second subgroup.

12. A device comprising:
a processing unit including:
one or more compute units, wherein each of the one or more compute units includes one or more processing elements for executing one or more work-items;
a local memory accessible by each of the one or more compute units; and
a private memory accessible by each of the one or more processing elements, wherein the processing unit is configured to:
execute a first work-item, wherein the first work-item corresponds to a first subgroup;
execute a second work-item, wherein the second work-item corresponds to a second subgroup;
execute a first barrier that synchronizes each work-item of the first subgroup and each work-item of the second subgroup;
perform, once each work-item of the first subgroup and each work-item of the second subgroup are synchronized by the first barrier, an inter-subgroup data transfer between the first subgroup and the second subgroup; and
execute a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

13. The device of claim 12, wherein the processing unit is configured to perform at least one of:
the inter-subgroup data transfer between the first subgroup and the second subgroup without using the local memory or a global memory accessible by the processing unit; or
the inter-subgroup data transfer between the first subgroup and the second subgroup using the private memory.

14. The device of claim 12, wherein the processing unit is configured to perform the inter-subgroup data transfer by being configured to perform at least one of:
copy data from a first memory location associated with the first subgroup to a second memory location associated with the second subgroup; or
copy data from the second memory location associated with the second subgroup to the first memory location associated with the first subgroup.

15. The device of claim 14, wherein the first memory location is a first hardware register and the second memory location is a second hardware register.

16. The device of claim 15, wherein the first hardware register is associated with the first work-item and the second hardware register is associated with the second work-item.

17. The device of claim 12, wherein the processing unit is configured to perform the inter-subgroup data transfer by being configured to perform at least one of:
copy data from one or more registers associated with one or more work-items corresponding to the first subgroup to one or more registers associated with one or more work-items corresponding to the second subgroup; or
copy data from the one or more registers associated with the one or more work-items corresponding to the second subgroup to the one or more registers associated with the one or more work-items corresponding to the first subgroup.

18. The device of claim 12, wherein the processing unit is configured to perform the inter-subgroup data transfer by being configured to use an inter-subgroup data transfer mechanism, wherein the inter-subgroup data transfer mechanism includes a software function executable by the processing unit, wherein the software function is an Application Programming Interface (API) function, and wherein the API function includes at least one of:

gentype copy(gentype variable, int subgroup_id, int named_barrier_id);

gentype generalized_shuffle(gentype variable, int fiber_id, int subgroup_id, int named_barrier_id);

gentype subgroup_exchange(gentype var, int srcSubgroupId);

gentype sub_group_exchange_{up|down|xor}(gentype var, int count, named_barrier*barrier_array);

gentype sub_group_shuffle_{up|down|xor}_exchange_{up|down|xor}(gentype var, int shuffle_cnt, int subgroup_cnt); or gentype generalized_shuffle(gentype variable, int workitem_id, int subgroup_id, int named_barrier_id).

19. The device of claim 12, wherein the processing unit is configured to:
perform the inter-subgroup data transfer between the first subgroup and the second subgroup without using any memory controller of the processing unit or accessible by the processing unit.

20. The device of claim 12, wherein the processing unit is configured to:
perform the inter-subgroup data transfer between the first subgroup and the second subgroup without sending a memory request to any memory controller of the processing unit or accessible by the processing unit.

21. The device of claim 12, wherein the processing unit is configured to:
perform an intra-subgroup data transfer between a first work-item of the first subgroup and a second work-item of the first subgroup, or between a first work-item of the second subgroup and a second work-item of the second subgroup.

22. An apparatus comprising:
means for executing a first work-item, wherein the first work-item corresponds to a first subgroup;
means for executing a second work-item, wherein the second work-item corresponds to a second subgroup;
means for executing a first barrier that synchronizes each work-item of the first subgroup and each work-item of the second subgroup;
means for performing, once each work-item of the first subgroup and each work-item of the second subgroup are synchronized by the first barrier, an inter-subgroup data transfer between the first subgroup and the second subgroup; and
means for executing a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

23. The apparatus of claim 22, wherein the means for performing the inter-subgroup data transfer includes at least one of:
means for copying data from a first memory location associated with the first subgroup to a second memory location associated with the second subgroup; or
means for copying data from the second memory location associated with the second subgroup to the first memory location associated with the first subgroup.

24. The apparatus of claim 23, wherein the first memory location is a first hardware register and the second memory location is a second hardware register.

25. The apparatus of claim 24, wherein the first hardware register is associated with the first work-item and the second hardware register is associated with the second work-item.

26. The apparatus of claim 22, wherein the means for performing the inter-subgroup data transfer includes at least one of:
means for copying data from one or more registers associated with one or more work-items corresponding to the first subgroup to one or more registers associated with one or more work-items corresponding to the second subgroup; or
means for copying data from the one or more registers associated with the one or more work-items corresponding to the second subgroup to the one or more registers associated with the one or more work-items corresponding to the first subgroup.

27. The apparatus of claim 22, wherein the means for performing the inter-subgroup data transfer includes means for executing an Application Programming Interface (API) function, and wherein the API function includes at least one of:
gentype copy(gentype variable, int subgroup_id, int named_barrier_id);
gentype generalized_shuffle(gentype variable, int fiber_id, int subgroup_id, int named_barrier_id);
gentype subgroup_exchange(gentype var, int srcSubgroupId);
gentype sub_group_exchange_{up|down|xor}(gentype var, int count, named_barrier*barrier_array);
gentype sub_group_shuffle_{up|down|xor}_exchange_{up|down|xor}(gentype var, int shuffle_cnt, int subgroup_cnt); or
gentype generalized_shuffle(gentype variable, int workitem_id, int subgroup_id, int named_barrier_id).

28. The apparatus of claim 22, further comprising:
means for performing the inter-subgroup data transfer between the first subgroup and the second subgroup without using any memory controller of the processing unit or accessible by the processing unit.

29. The apparatus of claim 22, further comprising:
means for performing the inter-subgroup data transfer between the first subgroup and the second subgroup without sending a memory request to any memory controller of the processing unit or accessible by the processing unit.

30. A non-transitory computer-readable storage medium having instructions stored thereon that, when executed, cause one or more processors to:
execute a first work-item, wherein the first work-item corresponds to a first subgroup;
execute a second work-item, wherein the second work-item corresponds to a second subgroup;
execute a first barrier that synchronizes each work-item of the first subgroup and each work-item of the second subgroup;
perform, once each work-item of the first subgroup and each work-item of the second subgroup are synchronized by the first barrier, an inter-subgroup data transfer between the first subgroup and the second subgroup; and
execute a second barrier that synchronizes each work-item of the first subgroup and each work-item of the second subgroup to ensure the inter-subgroup data transfer is complete before allowing each work-item of the first subgroup and each work-item of the second subgroup to proceed past the second barrier.

* * * * *